(12) United States Patent
Tamura et al.

(10) Patent No.: US 6,751,949 B2
(45) Date of Patent: Jun. 22, 2004

(54) EXHAUST EMISSION CONTROL DEVICE OF INTERNAL-COMBUSTION ENGINE

(75) Inventors: Yasuki Tamura, Tokyo (JP); Kazuhito Kawashima, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/240,113

(22) PCT Filed: Jan. 29, 2002

(86) PCT No.: PCT/JP02/00669

§ 371 (c)(1),
(2), (4) Date: Sep. 27, 2002

(87) PCT Pub. No.: WO02/061244

PCT Pub. Date: Aug. 8, 2002

(65) Prior Publication Data

US 2003/0074891 A1 Apr. 24, 2003

(30) Foreign Application Priority Data

Jan. 29, 2001 (JP) .......................................... 2001-20658
Mar. 9, 2001 (JP) .......................................... 2001-66701
Apr. 18, 2001 (JP) .......................................... 2001-119847
Aug. 16, 2001 (JP) .......................................... 2001-247223

(51) Int. Cl.[7] .............................................. F01N 3/00
(52) U.S. Cl. ........................ 60/284; 60/285; 60/286; 60/289; 60/292; 60/324
(58) Field of Search ................... 60/284, 285, 286, 60/289, 287, 288, 291, 292, 300, 324; 123/443

(56) References Cited

U.S. PATENT DOCUMENTS

| | | | | |
|---|---|---|---|---|
| 5,379,586 A | * | 1/1995 | Honji et al. | 60/276 |
| 5,493,857 A | * | 2/1996 | Komatsuda et al. | 60/284 |
| 5,524,433 A | * | 6/1996 | Adamczyk et al. | 60/276 |
| 5,577,383 A | * | 11/1996 | Kuroda et al. | 60/284 |
| 5,701,735 A | * | 12/1997 | Kawaguchi | 60/274 |
| 6,354,078 B1 | * | 3/2002 | Karlsson et al. | 60/274 |
| 6,370,869 B1 | * | 4/2002 | Hirota et al. | 60/276 |

FOREIGN PATENT DOCUMENTS

| | | |
|---|---|---|
| EP | 0 943 793 A2 | 9/1999 |
| EP | 1 030 046 A2 | 8/2000 |
| JP | 64-22843 U | 2/1989 |
| JP | 03-117611 A | 5/1991 |
| JP | 3-117633 A | 5/1991 |
| JP | 04-183921 A | 6/1992 |
| JP | 5-195761 A | 8/1993 |
| JP | 05-231195 A | 9/1993 |
| JP | 8-158858 A | 6/1996 |
| JP | 08-158897 A | 6/1996 |
| JP | 11-311119 A | 11/1999 |
| JP | 2001-132436 A | 5/2001 |

* cited by examiner

Primary Examiner—Binh Tran
(74) Attorney, Agent, or Firm—Birch, Stewart, Kolasch, & Birch, LLP

(57) ABSTRACT

At the start of operation of an internal-combustion engine (S10,S12,S14), an exhaust flow is restrained (to raise the exhaust pressure) (S18), secondary air is supplied (S20), and the combustion air-fuel ratio (A/F) is set within the range of rich air-fuel ratios (S16, S22).

11 Claims, 15 Drawing Sheets

EXHAUST EMISSION CONTROL DEVICE OF INTERNAL-COMBUSTION ENGINE

This application is the national phase under 35 U.S.C. §371 of PCT International Application No. PCT/JP02/00669 which has an International filing date of Jan. 29, 2002, which designated the United States of America.

TECHNICAL FIELD

The present invention relates to an exhaust emission control device of an internal-combustion engine, and more specifically, to a technique for reducing the delivery of harmful substances from an internal-combustion engine by using secondary air supply means.

BACKGROUND ART

An exhaust emission control technique is known that utilizes reaction on a catalyst in order to reduce harmful substances (including smoke, NOx, etc. as well as unburned substances such as HC, CO, $H_2$, etc.) in exhaust gas. Also known is a secondary air technique in which a catalyst is activated early by supplying secondary air to an exhaust port.

In some cases, however, harmful substances that are discharged before the activation of the catalyst amount to 90% of the total delivery in a cold mode, and arouse a critical problem.

Described in Jpn. Pat. Appln. KOKAI Publications Nos. 3-117611 and 4-183921, therefore, is a developed technique such that the exhaust pressure is raised in the cold state to activate the catalyst early. As is described in Jpn. Pat. Appln. KOKAI Publication No. 8-158897, for example, a technique is developed such that the catalyst is activated early by raising the exhaust pressure and supplying secondary air in the cold state.

According to an experiment conducted by the applicant hereof, it was confirmed that reaction in an exhaust system can be accelerated to enhance the exhaust gas purifying capability and improve the exhaust emission control efficiency by using the secondary air technique in combination with any of the exhaust pressure raising techniques described above.

However, an investigation made afterward by the applicant thereof indicates that the exhaust emission control performance lowers if the secondary air is supplied and the exhaust pressure is raised in the cold state with the combustion air-fuel ratio of the internal-combustion engine kept at a normal combustion air-fuel ratio for the case where the exhaust pressure is not raised.

If the fuel injection is carried out in an intake stroke so that the combustion air-fuel ratio in the cold state is a rich air-fuel ratio, in the case of a cylinder-injection internal-combustion engine, moreover, exhaust gas that contains plenty of hydrocarbon (HC), an unburned fuel, is discharged into exhaust passages. Since HC reacts less easily than carbon monoxide (CO) does, in general, the exhaust emission control performance is not improved very much although the secondary air supply and exhaust pressure raising are carried out.

In order to accelerate reaction with the secondary air in the exhaust system satisfactorily, on the other hand, the exhaust pressure should be raised to about 700 mmHg (933 hPa). Since the discharge pressure of an air pump that is generally used for the purpose of secondary air supply is about 150 mmHg (200 hPa), however, the air pump is expected to be considerably improved in performance. If the air pump is large-sized, there is the problem of increase in cost as well as in driving power consumption.

In this case, an attempt may be made to increase the internal EGR by raising the exhaust pressure and changing the overlap opening of an exhaust valve without using any secondary air, as is described in Jpn. Pat. Appln. KOKAI Publications Nos. 5-231195 and 8-158897, for example. However, the exhaust pressure raising technique and the increase of the internal EGR alone cannot satisfactorily accelerate the reaction in the exhaust system. Thus, it is hard to improve the exhaust emission control efficiency and fully activate the catalyst early.

DISCLOSURE OF THE INVENTION

The object of the present invention is to provide an exhaust emission control device of an internal-combustion engine, in which secondary air can be securely fed into an exhaust system with use of a low-priced configuration despite a rise in exhaust pressure, and reaction in the exhaust system can be satisfactorily accelerated at the start of operation of the internal-combustion engine, so that the exhaust emission control efficiency can be improved.

In order to achieve the above object, an exhaust emission control device of an internal-combustion engine according to the present invention comprises exhaust flow control means for restraining an exhaust flow so as to enhance the effect of reduction of the delivery of harmful substances at the start of operation of the internal-combustion engine, secondary air supply means for supplying secondary air to an exhaust system of the internal-combustion engine at the start of operation of the internal-combustion engine, and air-fuel ratio control means for adjusting the combustion air-fuel ratio of the internal-combustion engine to a rich air-fuel ratio at the start of operation of the internal-combustion engine.

In the case where the secondary air is supplied and the exhaust flow is restrained (to raise the exhaust pressure) at the start of operation of the internal-combustion engine, therefore, reaction in the exhaust system (including a combustion chamber, exhaust port, exhaust manifold, exhaust pipes, etc.) can be accelerated to improve the exhaust emission control efficiency by setting the combustion air-fuel ratio (air-fuel ratio before the secondary air supply) within the range of rich air-fuel ratios.

In the exhaust emission control device of the internal-combustion engine of the present invention, moreover, the air-fuel ratio control means controls the combustion air-fuel ratio of the internal-combustion engine so that the combustion air-fuel ratio is not lower than a combustion limit air-fuel ratio and not higher than 13.

In the case where the secondary air is supplied and the exhaust flow is restrained (to raise the exhaust pressure) at the start of operation of the internal-combustion engine, therefore, the exhaust emission control performance can be optimized by setting the combustion air-fuel ratio (air-fuel ratio before the secondary air supply) within the range of relatively high rich air-fuel ratios not lower than the combustion limit air-fuel ratio and not higher than 13.

Referring to FIG. 5, there are shown relations between the combustion air-fuel ratio (combustion A/F) before the secondary air supply and the HC delivery for each exhaust pressure as the results of measurement in 10 seconds after the start of operation of the internal-combustion engine. In this drawing, a two-dot chain line, dashed line, broken line, and full line represent cases of exhaust pressures of 0 mmHg (0 hPa), 300 mmHg (400 hPa), 500 mmHg (667 hPa), and 700 mmHg (933 hPa), respectively. If the exhaust pressure rises in this manner, the HC delivery is reduced in general within the range of rich air-fuel ratios not higher than 13, in particular.

This phenomenon is supposed to occur for the following reason. The rise of the exhaust pressure heightens the exhaust gas density. As the air-fuel ratio is enriched, the quantity of unburned substances discharged from the combustion chamber increases correspondingly, the probability of reaction in the exhaust system (including the combustion chamber, exhaust port, exhaust manifold, and exhaust pipes) increases, and the exhaust gas flows back from the exhaust port into the combustion chamber. As the gas in the combustion chamber is stirred, oxidation of unburned HC and the like are accelerated.

In the exhaust emission control device of the internal-combustion engine of the present invention, moreover, the secondary air supply means supplies the secondary air so that the exhaust air-fuel ratio obtained after the secondary air supply is a lean air-fuel ratio.

Thus, the reaction in the exhaust system can be further accelerated to improve the exhaust emission control efficiency additionally by supplying the secondary air so that the combustion air-fuel ratio is a rich air-fuel ratio and the exhaust air-fuel ratio after the secondary air supply is a lean air-fuel ratio.

In the exhaust emission control device of the internal-combustion engine of the present invention, furthermore, the secondary air supply means supplies the secondary air so that the exhaust air-fuel ratio obtained after the secondary air supply ranges from 18 to 22.

Thus, the exhaust emission control performance can be further optimized by supplying the secondary air so that the combustion air-fuel ratio is a rich air-fuel ratio and the exhaust air-fuel ratio after the secondary air supply ranges from 18 to 22.

Referring to FIG. 6, there is shown the relation between the exhaust air-fuel ratio (exhaust A/F) after the secondary air supply to the exhaust system and the HC delivery under the exhaust pressure of 700 mmHg (933 hPa) as the result of an experiment in 50 seconds after the start of operation of the internal-combustion engine. If the exhaust pressure is raised in this manner, the HC delivery has its minimum when the exhaust air-fuel ratio is 20 or thereabout, and can be specially lowered when the exhaust air-fuel ratio ranges from 18 to 22.

In the exhaust emission control device of the internal-combustion engine of the present invention, furthermore, the internal-combustion engine is a multi-cylinder internal-combustion engine, and the secondary air supply means supplies the secondary air by stopping fuel supply to some of cylinders or carrying out lean-A/F operation.

If the secondary air is supplied by stopping the fuel supply to some of the cylinders or carrying out the lean-A/F operation, therefore, plenty of oxygen is discharged from some cylinders, while great quantities of unburned substances are discharged with a rich air-fuel ratio from the other cylinders. Thus, when the exhaust pressure is raised, the unburned substances and oxygen react satisfactorily in the exhaust system, so that the exhaust emission control efficiency can be improved with ease.

In the exhaust emission control device of the internal-combustion engine of the present invention, moreover, the internal-combustion engine is a multi-cylinder internal-combustion engine and comprises two exhaust passages provided independently for each of two cylinder groups into which cylinders of the multi-cylinder internal-combustion engine are divided and communicating channels connecting the two exhaust passages, and the secondary air supply means includes exhaust oxygen quantity increasing means for increasing the quantity of oxygen in exhaust gas discharged from one of the two cylinder groups, and supplies the secondary air as the exhaust control means restrains the exhaust flow so that the degree of restraint of the flow of the exhaust gas discharged from the one cylinder group is higher than the degree of restraint of the flow of the exhaust gas discharged from the other cylinder group when the quantity of oxygen in the exhaust gas discharged from the one cylinder group is increased by means of the exhaust oxygen quantity increasing means.

Thus, the exhaust oxygen quantity increasing means is used to increase the quantity of oxygen in the exhaust gas discharged from the one cylinder group (e.g., to perform lean-A/F operation), and the exhaust flow is restrained so that the degree of restraint of the flow of the exhaust gas discharged from the one cylinder group (degree of rise of the exhaust pressure) is higher than the degree of restraint of the flow of the exhaust gas discharged from the other cylinder group. As this is done, the exhaust pressure of the oxygen-rich exhaust gas discharged from the one cylinder group becomes higher than the exhaust pressure of the exhaust gas discharged from the other cylinder group. Based on the resulting pressure difference, the oxygen-rich exhaust gas is supplied as the secondary air from the exhaust passages of the one cylinder group to the exhaust passages of the other cylinder group through the communicating channels.

Thus, in the case where the exhaust flow is restrained to raise the exhaust pressure, the secondary air can be supplied securely to accelerate the reaction in the exhaust system without using any large-capacity secondary air pump, so that the exhaust emission control efficiency can be improved with use of a simple configuration without any increase in cost.

In the exhaust emission control device of the internal-combustion engine of the present invention, furthermore, the internal-combustion engine is a multi-cylinder internal-combustion engine and comprises two exhaust passages provided independently for each of two cylinder groups into which cylinders of the multi-cylinder internal-combustion engine are divided and communicating channels connecting the two exhaust passages, and the secondary air supply means includes exhaust oxygen quantity increasing means for increasing the quantity of oxygen in exhaust gas discharged from one of the two cylinder groups and an air pump attached to the communicating channels and capable of force-feeding the exhaust gas from the exhaust passages of the one cylinder group to the exhaust passages of the other cylinder group.

Thus, the exhaust flow is restrained (to raise the exhaust pressure) by means of the exhaust flow control means, the quantity of oxygen in exhaust gas discharged from the one cylinder group is increased by means of the exhaust oxygen quantity increasing means, and the air pump is actuated. As this is done, the oxygen-rich exhaust gas is supplied as the secondary air from the exhaust passages of the one cylinder group to the exhaust passages of the other cylinder group through the communicating channels despite the rise in the exhaust pressure attributable to the restraint of the exhaust flow.

Thus, in the case where the exhaust flow is restrained to raise the exhaust pressure, the secondary air can be supplied securely to accelerate the reaction in the exhaust system by means of a small-capacity air pump, not a large-capacity secondary air pump, so that the exhaust emission control efficiency can be improved with use of a simple configuration without any increase in cost.

In the exhaust emission control device of the internal-combustion engine of the present invention, furthermore, the exhaust oxygen quantity increasing means stops fuel supply to one of the two cylinder groups or performs lean-A/F operation.

Thus, the quantity of oxygen discharged from the on cylinder group can be easily increased to feed the secondary air securely to the exhaust system by stopping the fuel supply to the one cylinder group or performing the lean-A/F operation.

Further, the exhaust emission control device of the internal-combustion engine of the present invention is an exhaust emission control device of an internal-combustion engine, which has an injection valve for injecting a fuel directly into a combustion chamber, fuel injection control means for controlling fuel injection by means of the injection valve, and air-fuel ratio control means for controlling the air-fuel ratio, comprising exhaust flow control means for restraining an exhaust flow so as to enhance the effect of reduction of the delivery of harmful substances at the start of operation of the internal-combustion engine, and secondary air supply means for supplying secondary air to the exhaust system of the internal-combustion engine at the start of operation of the internal-combustion engine, the fuel injection control means and the air-fuel ratio control means being adapted to inject the fuel in a compression stroke of the internal-combustion engine and to adjust the combustion air-fuel ratio to the theoretical air-fuel ratio or a rich air-fuel ratio, respectively, when the secondary air is supplied to the exhaust system by means of the secondary air supply means.

A conventional cylinder-injection internal-combustion engine in which a fuel is injected directly into a combustion chamber is believed to be liable to plug smoldering, since the fuel is injected into a region near a spark plug in compression-stroke injection. The applicant hereof conducted an experiment and found that compression-stroke injection with the internal-combustion engine in a cold state, in particular, was able to ensure a satisfactory spray condition, lessen the plug smoldering, and generate plenty of CO. In feeding the secondary air into the exhaust passages, based on this fact, the fuel is injected in the compression stroke of the internal-combustion engine to generate CO so that the combustion air-fuel ratio is the theoretical air-fuel ratio or a rich air-fuel ratio.

Thus, in the case where the secondary air is supplied and the exhaust flow is restrained (to raise the exhaust pressure) at the start of operation of the internal-combustion engine, the exhaust gas can be made to contain plenty of CO. Since CO reacts more easily than HC does, the reaction in the exhaust system can be satisfactorily accelerated to improve the exhaust emission control efficiency.

BEST MODE FOR CARRYING OUT THE INVENTION

A first embodiment will be described first.

Figure 1:
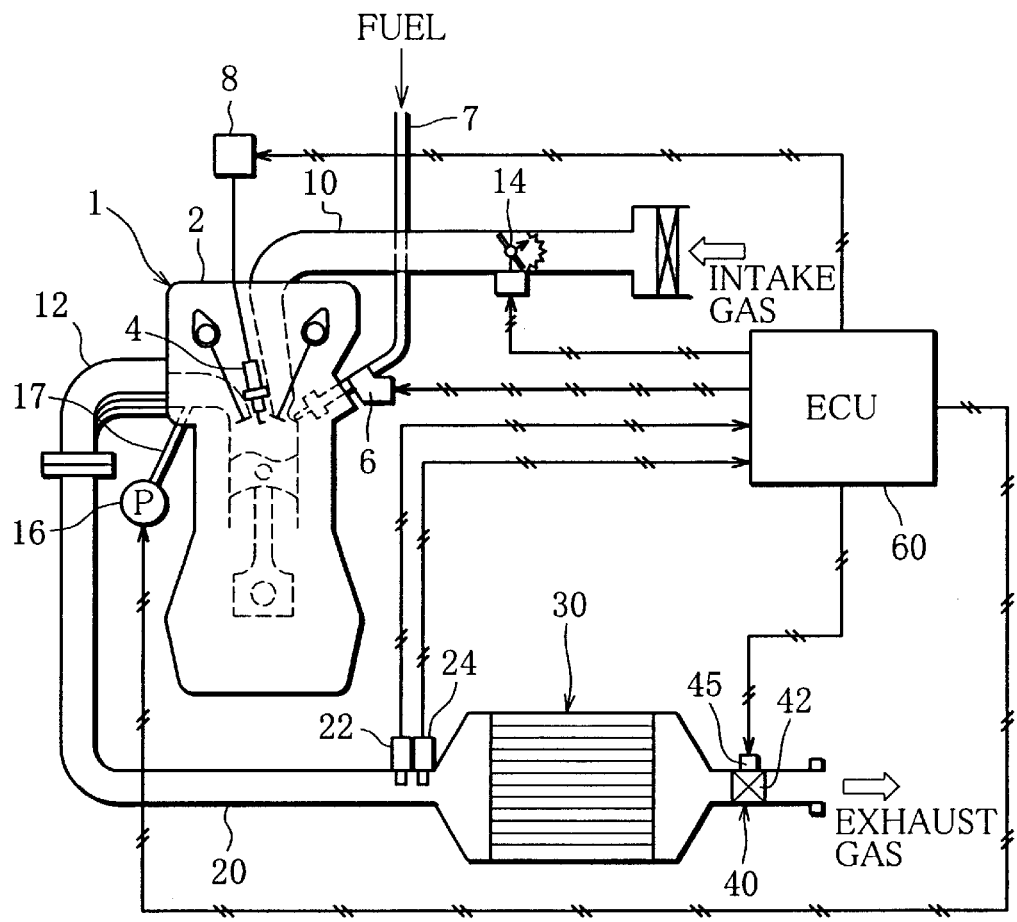
FIG. 1 is a schematic view of an exhaust emission control device of an internal-combustion engine according to first and fifth embodiments of the present invention.

Referring now to FIG. 1, there is shown an outline of an exhaust emission control device of an internal-combustion engine according to the first embodiment of the present invention. The following is a description of the configuration of this exhaust emission control device.

For example, a cylinder-injection spark-ignition gasoline engine is used as an engine body (hereinafter referred to simply as engine) 1 that serves as an internal-combustion engine. In this engine, fuel injection in a compression stroke (compression-stroke injection) can be carried out together with fuel injection in an intake stroke (intake-stroke injection) by changing the fuel injection mode. This cylinder-injection engine 1 can easily realize operation with a lean air-fuel ratio (lean-A/F operation), besides operation with a theoretical air-fuel ratio (stoichiometric) and operation with a rich air-fuel ratio (rich-A/F operation).

As shown in the same drawing, a cylinder head 2 of the engine 1 is fitted with an electromagnetic fuel injection valve 6 along with a spark plug 4 for each cylinder, whereby a fuel can be injected directly into a combustion chamber.

The spark plug 4 is connected with a spark coil 8 that outputs high voltage. Further, the fuel injection valve 6 is connected with a fuel supplier (not shown) having a fuel tank by means of a fuel pipe 7. More specifically, the fuel supplier is provided with a low-pressure fuel pump and a high-pressure fuel pump, whereby the fuel in the fuel tank can be supplied at a low fuel pressure or a high fuel pressure to the fuel injection valve 6, so that the fuel can be injected from the fuel injection valve 6 into the combustion chamber at a desired fuel pressure.

The cylinder head 2 is formed with intake ports for the individual cylinders arranged substantially in the vertical direction and is connected with one end of an intake manifold 10 so as to communicate with each intake port. The intake manifold 10 is provided with an electromagnetic throttle valve 14 that regulates the rate of intake.

Further, the cylinder head 2 is formed with exhaust ports for the individual cylinders arranged substantially in the horizontal direction and is connected with one end of an exhaust manifold 12 so as to communicate with each exhaust port.

Further, each exhaust port is connected with a secondary air pump (secondary air supply means) 16 by means of an air passage 17. Secondary air can be supplied to each exhaust port as the secondary air pump 16 is actuated.

Since the cylinder-injection engine 1 is of a known type, a detailed description of its configuration is omitted.

An exhaust pipe (exhaust passage) 20 is connected to the other end of the exhaust manifold 12.

The exhaust pipe 20 is fitted with a three-way catalyst 30 for use as an exhaust emission control device. The three-way catalyst 30 has an active noble metal, such as copper (Cu), cobalt (Co), silver (Ag), platinum (Pt), rhodium (Rh), or palladium (Pd), as its carrier.

As shown in the same drawing, moreover, the exhaust pipe 20 is provided with an exhaust pressure sensor 22 for detecting the exhaust pressure and an $O_2$ sensor or A/F sensor 24.

Further, the exhaust pipe 20 is fitted with an exhaust flow control device (exhaust flow control means) 40 in that part thereof which is situated on the lower-stream side of the three-way catalyst 30.

The exhaust flow control device 40 is a device that is designed to accelerate reduction of harmful substances (including NOx, smoke, $H_2$, etc. as well as unburned substances such as HC, CO, etc.) in exhaust gas, and is configured to be able to change the exhaust pressure, exhaust gas density, and/or exhaust flow rate (factor that causes augmentation of the effect of reduction). More specifically, the exhaust flow control device 40 is composed of a closed on-off valve 42 that can adjust the flow area of the exhaust pipe 20.

Figure 2:
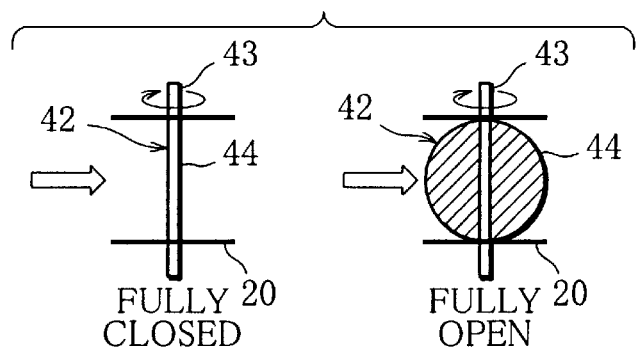
FIG. 2 is a diagram showing a butterfly valve for use as an exhaust flow control device.

The closed on-off valve 42 may be any of various types. In this case, a butterfly valve is used that can be adjust the flow area of the exhaust pipe 20 by rotating a valve disc 44 around a shaft 43 that penetrates the exhaust pipe 20, as shown in FIG. 2 that illustrates a valve-open state and a valve-closed state. The butterfly valve is provided with an actuator 45, and the butterfly valve is opened or closed as the valve disc 44 is rotated around the shaft 43 by means of the actuator 45.

An ECU 60 is provided with memories (ROM, RAM, nonvolatile RAM, etc.), central processing unit (CPU), timer counter, etc. The ECU 60 carries out comprehensive control of the exhaust emission control device including the engine 1.

The input side of the ECU 60 is connected with the aforesaid various sensors, including the exhaust pressure sensor 22, $O_2$ sensor or A/F sensor 24, etc., and is supplied with detection information from these sensors.

On the other hand, the output side of the ECU 60 is connected with the aforesaid various output devices, including the fuel injection valve 6, spark coil 8, throttle valve 14, secondary air pump (secondary air supply means) 16, actuator 45, etc. An injection quantity, fuel injection timing, ignition timing, exhaust flow controlled variable, etc. that are computed in accordance with the detection information from the various sensors are delivered to the various output devices, individually. Thereupon, an appropriate quantity of fuel is injected from the fuel injection valve 6 at a proper time, spark ignition is carried out at a proper time by means of the spark plug 4, the secondary air is supplied at a proper time, and the on-off valve 42 is controlled so that a desired exhaust flow controlled variable (e.g., target exhaust pressure) is obtained.

The following is a description of the operation of the exhaust emission control device according to the first embodiment of the present invention constructed in this manner, that is, cold start control of the engine 1 according to the first embodiment.

Figure 3:
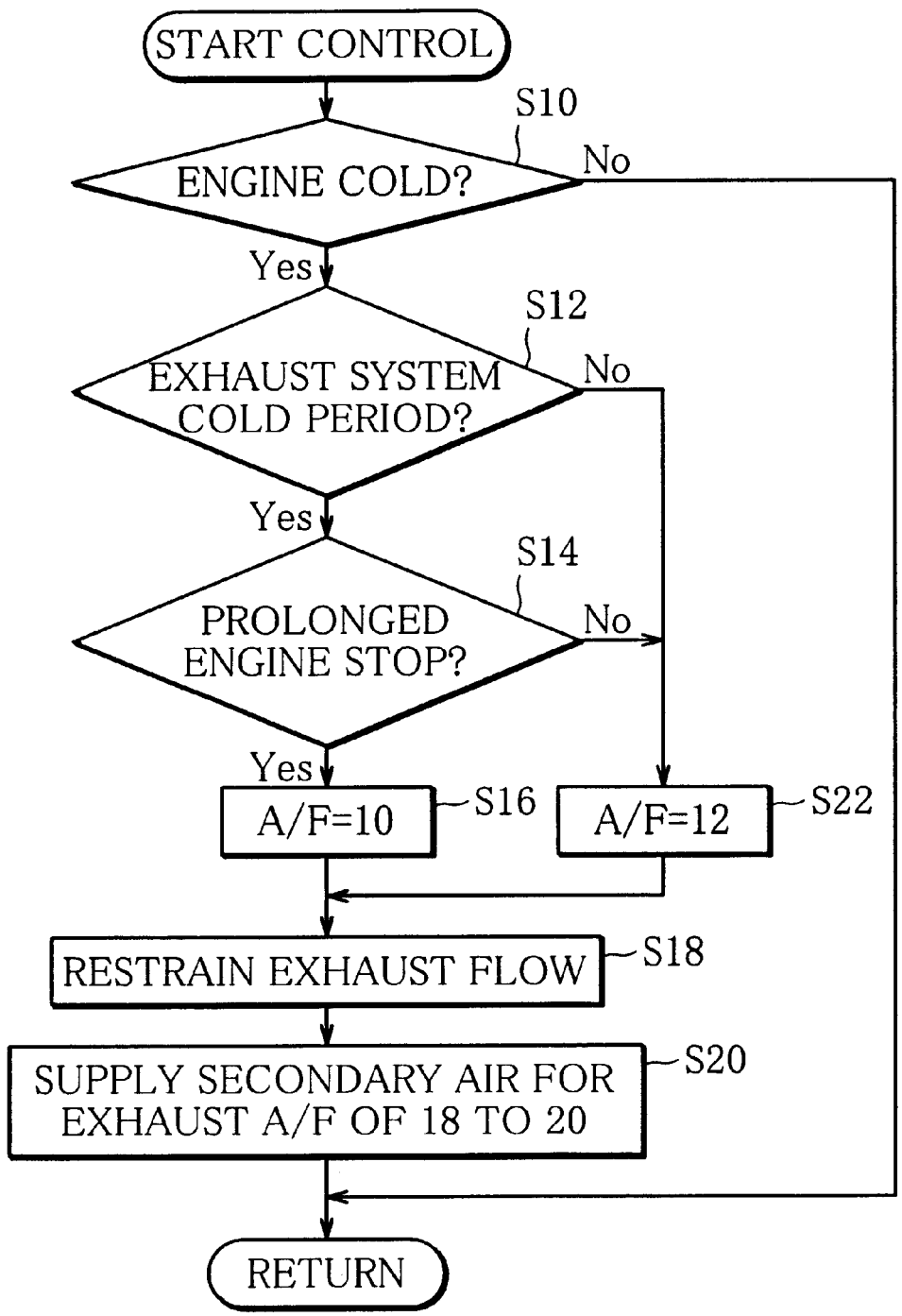
FIG. 3 is a flowchart showing a control routine of start control according to the first embodiment.

Referring to FIG. 3, there is shown a flowchart for a start control routine according to the first embodiment. The start control will now be described with reference to the same drawing.

In Step S10, whether or not the engine 1 is in its cold state is determined. In this case, whether or not the cooling water temperature is lower than a given temperature (e.g., 60° C.) is determined. If the decision is No, it can be concluded that the engine 1 is in its warming-up state, whereupon this routine is finished. If the decision is Yes, on the other hand, it can be concluded that the engine 1 is in the cold state, whereupon the program advances to Step S12. The decision in Step S10 is not limited to the decision on whether or not the cooling water temperature is lower than the given temperature, and may alternatively be a decision on whether or not the elapsed time after the start of operation is shorter than a given time (e.g., 50 sec), for example.

In Step S12, whether or not an exhaust system is in its cold state is determined. This decision depends on whether or not any of the following conditions is met, for example:

elapsed time after start<given time (e.g., 4 sec), one or more fulfillments of (engine speed>given rotational speed (e.g., 1,200 rpm)), exhaust gas temperature<given temperature (e.g., 600° C.), oil temperature<given temperature (e.g., 35° C.).

cooling water temperature<given temperature (e.g., 40° C.).

Since the exhaust system (exhaust port, exhaust manifold 12, etc.) can be easily brought to its warm state before the engine 1 is brought to its warming-up state, the cold period of the exhaust system is shorter than the cold period of the engine 1. Thus, the cold state of the exhaust system described herein can be discriminated from the cold state of the engine 1. Therefore, threshold decision values for the aforesaid conditions are lower than threshold decision values for the warming-up state of the engine 1.

If any of the aforesaid conditions is met so that it is concluded that the decision in Step S12 is Yes, that is, the exhaust system is in the cold state, the program then advances to Step S14.

In Step S14, whether or not an engine stop period was longer than a given time (e.g., 15 min) is determined. More specifically, whether or not a time long enough to make the engine 1 cold has elapsed since the stoppage of the engine 1 is determined.

The given values as the threshold decision values for the aforesaid conditions used in Steps S12 and S14 may be fixed values. Alternatively, however, they may be map values that are optimized according to operating conditions (elapsed time after start, engine rotational speed, engine stop period, volumetric efficiency, brake mean effective pressure, exhaust gas temperature, oil temperature, cooling water temperature, rate of intake, exhaust volume flow rate, exhaust mass flow rate, or one or more indexes associated with these values).

Figure 4:
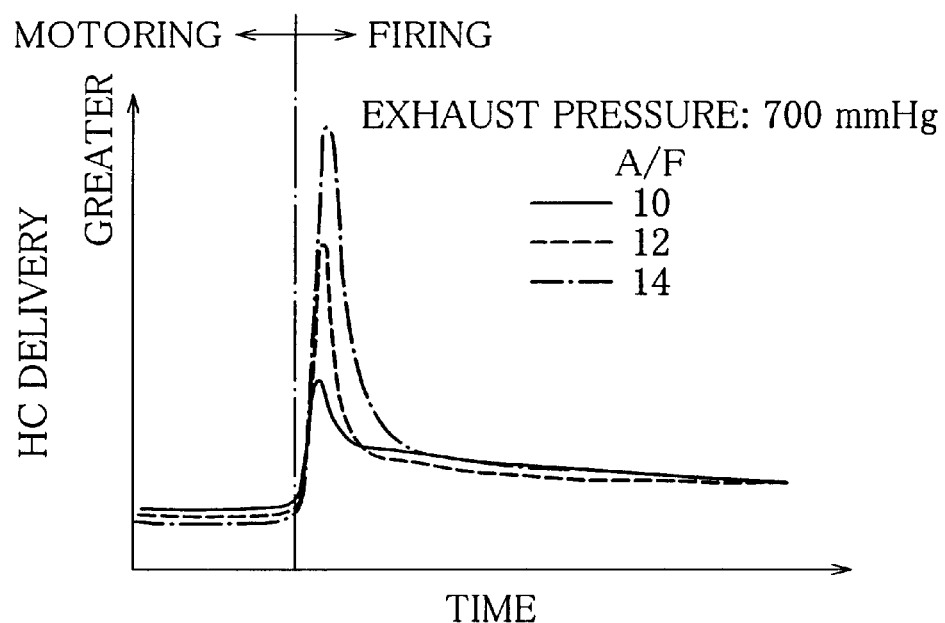
FIG. 4 is a diagram showing time-based changes of the delivery (e.g., at a catalyst outlet) of HC for cases where the exhaust pressure is adjusted to a given pressure (e.g., 700 mmHg=933 hPa) and the combustion A/F is adjusted to 10 (full line) and 12 (broken line), compared with a case where the combustion A/F is adjusted to 14 (dashed line)

A phenomenon is confirmed such that reaction of harmful substances, such as unburned substances, NOx, etc., cannot be accelerated very much and the exhaust emission control performance lowers in the aforesaid manner so that the delivery of the harmful substances (HC in the main) increases temporarily even if exhaust flow control is carried out to raise the exhaust pressure and exhaust gas density in a period during which the exhaust system is in the cold state (see FIG. 4).

This phenomenon is supposed to occur for the following reason. Since the exhaust system temperature near the exhaust port is normally low immediately after the start of operation of the internal-combustion engine (immediately after the start of cranking), exhaust gas is cooled to lower the exhaust gas temperature, so that reaction cannot be accelerated very much even if the exhaust pressure is raised.

Figure 5:
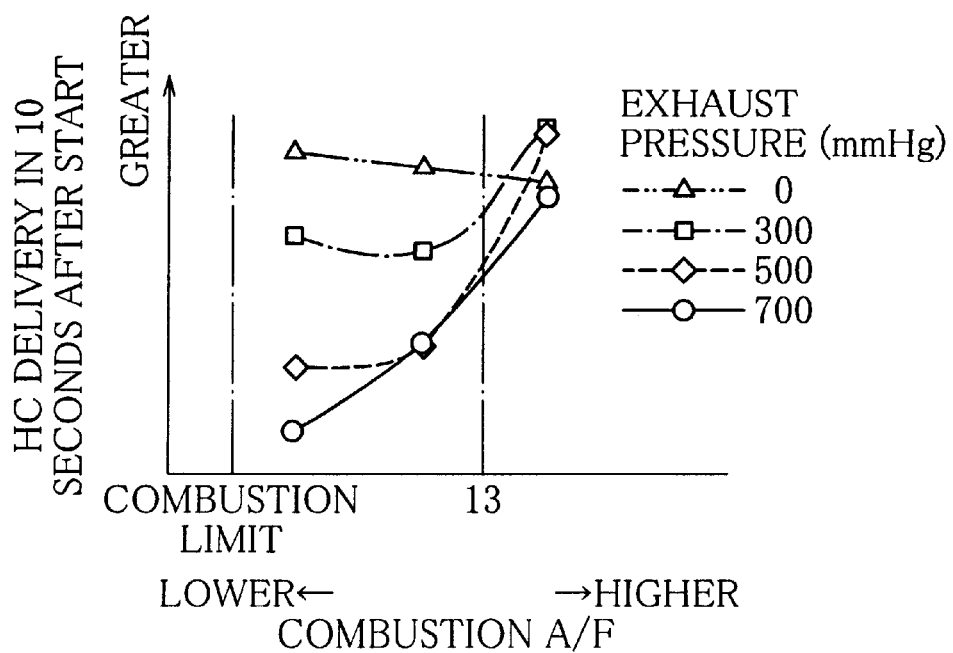
FIG. 5 is a diagram showing relations between the combustion air-fuel ratio before secondary air supply and the HC delivery for each exhaust pressure as the results of measurement in 10 seconds after the start of operation of the internal-combustion engine.

If the decisions in Steps S12 and S14 are Yes, according to this exhaust emission control device, therefore, the combustion air-fuel ratio (combustion A/F) is enriched in Step S16 lest the exhaust emission control performance be lowered in the period during which the exhaust system is in the cold state immediately after the start of operation of the engine 1. In this case, the combustion A/F is minimized to, for example, 10 (A/F=10) with reference to FIG. 5. However, it is necessary only that the combustion A/F be a rich air-fuel ratio, and preferably, the combustion A/F should be restricted to the range from a combustion limit air-fuel ratio to 13 (air-fuel ratio control means). In this case, the fuel injection is intake-stroke injection.

If the air-fuel ratio is enriched in this manner, the injection quantity increases, so that the combustion heat release in the combustion chamber increases, the combustion temperature rises, and the quantity of unburned substances increases. Accordingly, the probability of reaction of the unburned substances in the combustion chamber and the exhaust system, including the exhaust port, exhaust manifold, etc., is enhanced, so that the reaction is accelerated like a chain reaction. Thus, the exhaust system including the exhaust port, exhaust manifold, etc. in the cold state can be heated up in a short time, so that the exhaust gas temperature immediately after the start of operation can be prevented from lowering.

In the next step or Step S18, restraint of the exhaust flow is executed (exhaust flow control means). More specifically, the on-off valve 42 is opened to restrain the exhaust flow, thereby raising the exhaust pressure. In this case, the actuator 45 is operated in accordance with information from the exhaust pressure sensor 22, whereby the exhaust pressure is raised to and kept at a given pressure (e.g., 700 mmHg=933 hPa).

Even immediately after the start of operation of the engine 1, therefore, the exhaust gas temperature can be prevented from lowering as the exhaust pressure is kept high enough to lengthen the residence time or reaction time of oxygen and the unburned substances. Thus, oxidation of HC, CO, etc. and reduction of NOx in the exhaust system can be favorably accelerated at a point of time immediately after the start of operation, and the delivery of HC, CO, NOx, etc. can be satisfactorily restrained from temporarily increasing immediately after the start of operation.

Figure 6:
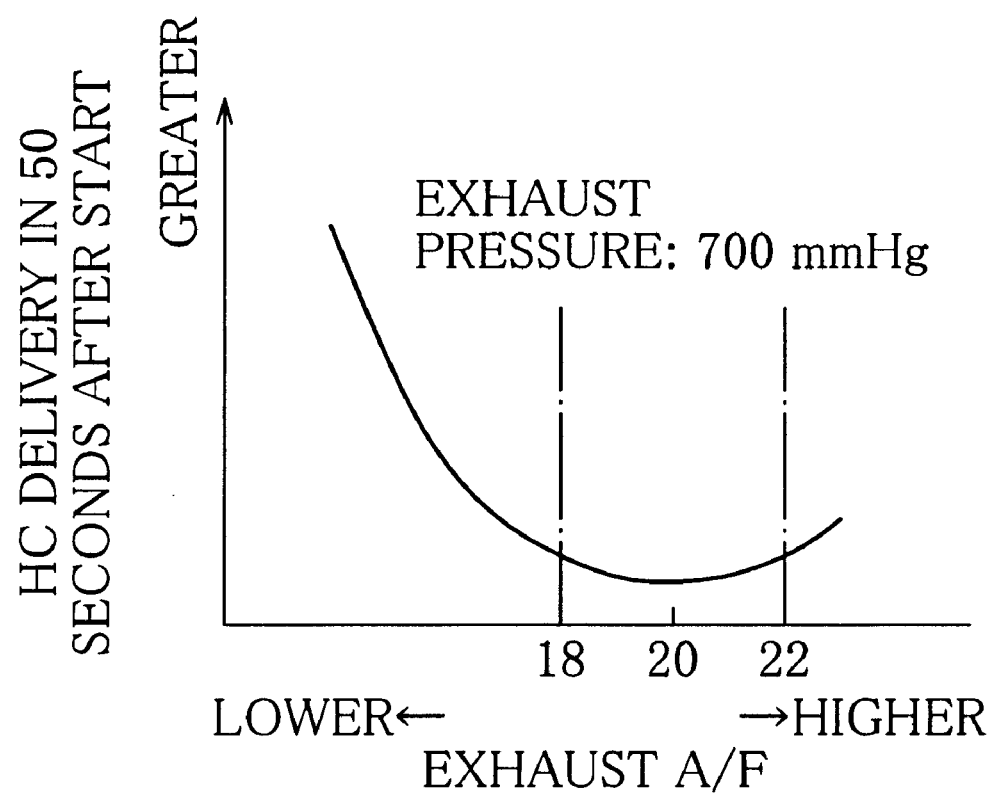
FIG. 6 is a diagram showing the relation between the exhaust air-fuel ratio after secondary air supply to an exhaust system and the HC delivery under the exhaust pressure of 700 mmHg (933 hPa) as the result of an experiment in 50 seconds after the start of operation of the internal-combustion engine.

In Step S20, the secondary air is supplied from the secondary air pump 16 so that the exhaust air-fuel ratio (exhaust A/F) is a lean air-fuel ratio ranging from 18 to 22, in particular, in accordance with information from the $O_2$ sensor or A/F sensor 24 (secondary air supply means). Preferably, in this case, the exhaust A/F should be adjusted to 20, as shown in FIG. 6.

Thus, if the secondary air supply is carried out so that the exhaust A/F ranges from 18 to 22 without failing to keep the exhaust pressure high enough, the oxidation and reduction in the exhaust system are rapidly accelerated like a chain reaction, so that harmful substances, such as HC, CO, NOx, etc., can be removed satisfactorily.

If any of the aforesaid conditions fails to be met because the elapsed time after the start of operation exceeds the given time (e.g., 4 sec), for example, so that the decision in Step S12 or S14 is concluded to be No, on the other hand, the program then advances to Step S22. Thereupon, the combustion A/F is adjusted to, for example, 12 (A/F=12) (air-fuel ratio control means).

Thus, if the decision in Step S12 or S14 is No, the combustion chamber and the exhaust system, including the exhaust port, exhaust manifold 12, etc., can be concluded to be already off the cold state and in the warm state. In this state, therefore, the exhaust system need not be heated up any more, and the combustion A/F is adjusted to a value a little closer to the theoretical air-fuel ratio than to the combustion A/F (A/F=10) for the cold state.

Continuing the enrichment requires increase in the exhaust flow rate to compensate for reduction in torque. By making the aforesaid adjustment, however, the increase of the delivery of the harmful substances that is involved in the increase of the exhaust flow rate can be restrained, and the fuel-efficiency can be prevented from lowering.

Also in this case, the combustion A/F is adjusted to 12 (A/F=12), for example, and is a rich air-fuel ratio preferably ranging from the combustion limit air-fuel ratio to 13 (air-fuel ratio control means).

After Step S22 is executed, the exhaust flow control is carried out in the same manner as aforesaid and the secondary air is supplied so that the exhaust air-fuel ratio (exhaust A/F) ranges from 18 to 22, in Steps S18 and S20.

Thus, the oxidation and reduction in the exhaust system continue to be rapidly accelerated like a chain reaction, and harmful substances, such as HC, CO, NOx, etc., continue to removed satisfactorily.

Thus, the delivery of HC, CO, NOx, and other harmful substances can be reduced to improve the exhaust emission control efficiency by restraining the exhaust flow, adjusting the combustion A/F to a rich air-fuel ratio, and supplying the secondary air so that the exhaust A/F is a lean air-fuel ratio, at the start of operation of the engine 1. The exhaust emission control performance can be optimized by adjusting the combustion A/F within the range from the combustion limit air-fuel ratio to 13 and supplying the secondary air so that the exhaust A/F ranges from 18 to 22, in particular. Since plenty of heat of reaction is generated, moreover, the exhaust gas temperature can be kept high, and the three-way catalyst 30 can be activated early.

Referring to FIG. 4, there are shown time-based changes of the delivery (e.g., at a catalyst outlet) of HC for cases where the secondary air is supplied, the exhaust pressure is adjusted to a given pressure (e.g., 700 mmHg=933 hPa), and the combustion A/F is adjusted to 10 (full line) and 12 (broken line), compared with a case where the combustion A/F is adjusted to 14 (dashed line). Immediately after the start of operation, as seen from this drawing, the HC delivery is considerably reduced when the combustion A/F is 10, that is, if the combustion A/F is closer to the combustion limit air-fuel ratio. Thereafter, the HC delivery has its minimum when the combustion A/F is 12 or thereabout. At the start of operation of the engine 1, therefore, the delivery of harmful substances can be reduced without failing to optimizing the exhaust emission control performance by adjusting the combustion A/F to a rich air-fuel ratio, especially to a value within the range from the combustion limit air-fuel ratio to 13, such as 10 or 12. By supplying the secondary air so that the exhaust A/F ranges from 18 to 22, the delivery of the harmful substances can be further reduced without failing to optimizing the exhaust emission control performance additionally.

According to this arrangement, the combustion A/F is adjusted to 10 immediately after the start of operation of the engine 1 and then changed into 12. However, the combustion A/F is not limited to this two-stage switching, and may be switched in three or more stages within the range of rich air-fuel ratios, depending on the elapsed time since the start of operation of the engine 1. Thus, the exhaust emission control performance can be optimized additionally. Preferably, in this case, the value of the combustion A/F should be gradually increased with time. More specifically, the combustion A/F should be gradually changed from a rich air-fuel ratio into a value near the theoretical air-fuel ratio. As this is done, the combustion A/F may be changed continuously.

The A/F values described in this specification (including the claims) are values for domestic premium gasoline (theoretical air-fuel ratio: 14.41). The individual A/F values imply the following equivalent ratios ø:

$A/F=10 \to ø \approx 1.441$, $A/F=12 \to ø \approx 1.201$, $A/F=13 \to ø \approx 1.108$, $A/F=14 \to ø \approx 1.029$, $A/F=18 \to ø \approx 0.801$, $A/F=20 \to ø 26\ 0.721$, $A/F=22 \to ø \approx 0.655$.

The following is a description of a second embodiment.

The second embodiment differs from the first embodiment in that no secondary air pump is used and that the engine 1 is a multi-cylinder engine. A description of portions that are shared with the first embodiment is omitted herein, and only different portions will be described below.

Figure 7:
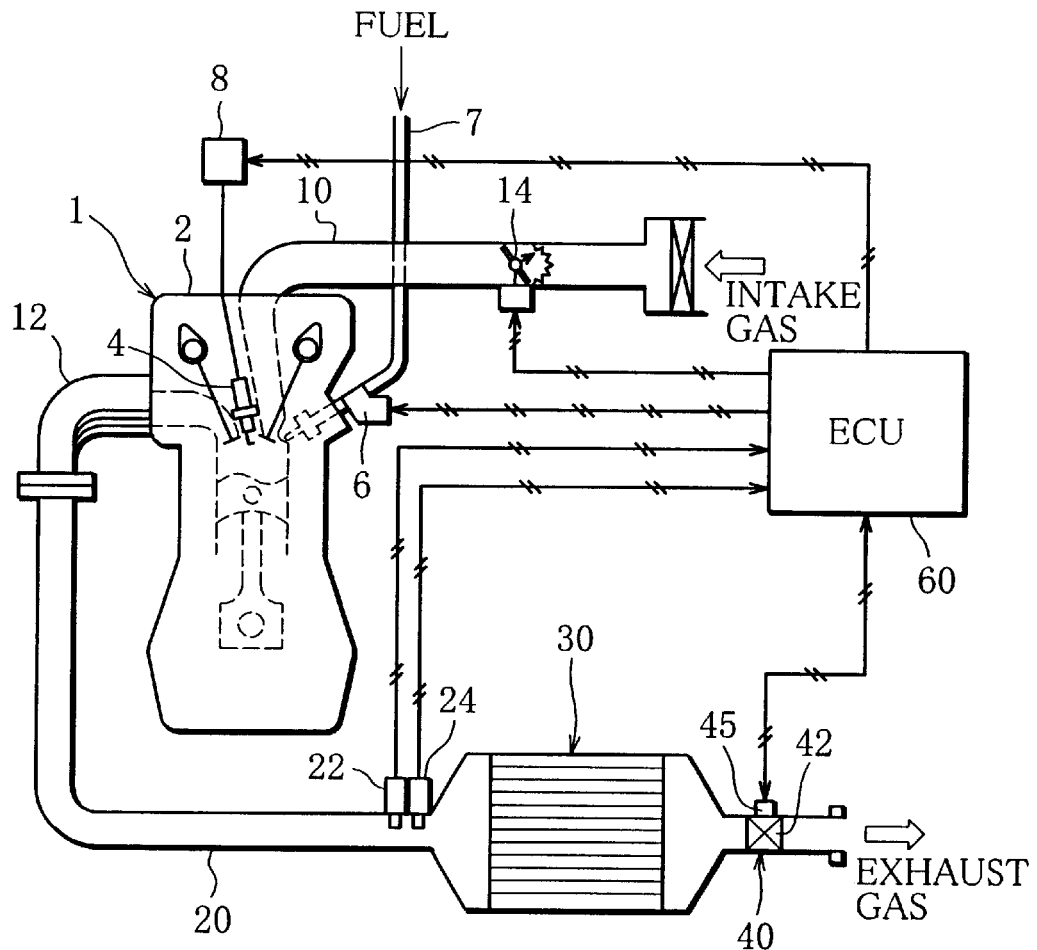
FIG. 7 is a schematic view of an exhaust emission control device of an internal-combustion engine according to a second embodiment of the present invention.

Referring to FIG. 7, there is shown an outline of an exhaust emission control device of an internal-combustion engine according to the second embodiment of the present invention. In this second embodiment, a cylinder-injection spark-ignition four-cylinder gasoline engine is used as the engine 1, for example.

Figure 8:
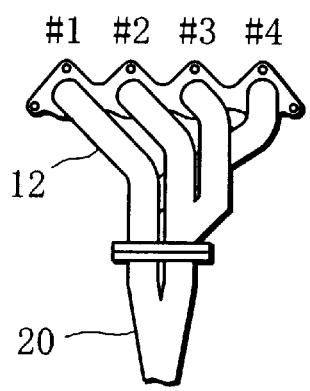
FIG. 8 is a view showing an exhaust manifold.

In this case, moreover, a dual-type exhaust manifold system such as the one shown in FIG. 8 is used as the exhaust manifold 12. Alternatively, the exhaust manifold 12 may be a single-type exhaust manifold system or a clamshell-type exhaust manifold system.

The following is a description of the operation of the exhaust emission control device of the internal-combustion engine according to the second embodiment of the present invention constructed in this manner, that is, cold start control of the engine 1 according to the second embodiment.

Figure 9:
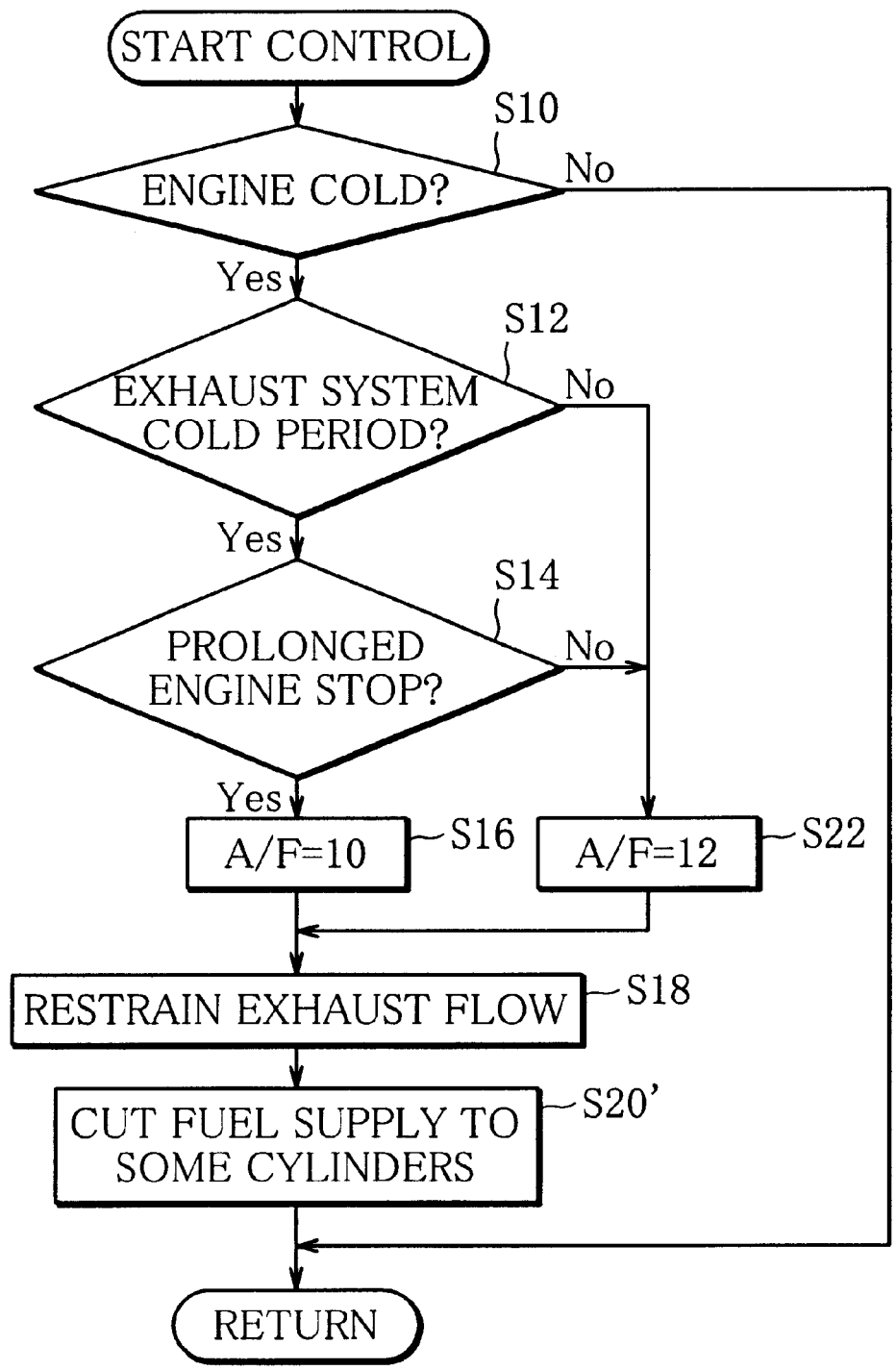
FIG. 9 is a flowchart showing a control routine of start control according to the second embodiment.

Referring to FIG. 9, there is shown a flowchart for a start control routine according to the second embodiment. The start control will now be described with reference to the same drawing. The following is a description of only those portions which are different from the flowchart of FIG. 3.

When the exhaust flow is restrained in Steps S10 to S16 or S22, according to this second embodiment, fuel supply to any one of cylinders #1 to #4 is stopped (fuel-cut) in Step S20' (secondary air supply means), and the combustion air-fuel ratio for the other three cylinders is kept at the aforesaid rich air-fuel ratio. Since the engine 1 is a four-cylinder engine, the fuel supply for one cylinder is cut with every four cycles. For example, the fuel supply for the cylinder #1 is cut, and the fuel is injected through the fuel injection valve 6 into the cylinders #2 to #4 so that a rich air-fuel ratio is obtained. In this case, the fuel injection into the cylinders #2 to #4 is intake-stroke injection.

Thus, in this case, the fuel supply is controlled so that the fuel in a rich air-fuel ratio is supplied to the next cylinder after the fuel-cut for one cylinder is carried out.

Although the fuel-cut is carried out for only one of the cylinders in the case described above, the fuel-cut may be carried out for any two of the cylinders with every two cycles.

If the fuel-cut is thus carried out for any of the cylinders while the fuel is supplied to other cylinders so that the air-fuel ratio is a rich air-fuel ratio, only air (exhaust air) is discharged into the exhaust manifold 12 from some of the cylinders that are subjected to the fuel-cut, while great quantities of unburned substances (HC, CO, etc.) that are attributable to incomplete combustion are discharged into the exhaust manifold 12 from the other cylinders to which the fuel is excessively supplied to obtain the rich air-fuel ratio.

If oxygen and the unburned substances are supplied to the exhaust manifold 12, oxidation is accelerated satisfactorily in the exhaust system, including the exhaust manifold 12 and the exhaust pipe 20, in the presence of sufficient oxygen with the exhaust flow restrained.

Thus, as in the case of the first embodiment, the delivery of HC, CO, NOx, and other harmful substances can be reduced to improve the exhaust emission control efficiency. Since plenty of heat of reaction is generated, moreover, the exhaust gas temperature can be kept high, and the three-way catalyst 30 can be activated early.

Although the exhaust air is supplied through the execution of fuel-cut in the case described above, the fuel-cut may be replaced with lean-A/F operation such that exhaust gas containing plenty of surplus oxygen is supplied as the exhaust air (exhaust oxygen quantity increasing means). The same effect as aforesaid can be also obtained in this case.

The following is a description of a third embodiment.

A description of those portions of the third embodiment which are shared with the first embodiment is also omitted, and only different portions will be described below.

Figure 10:
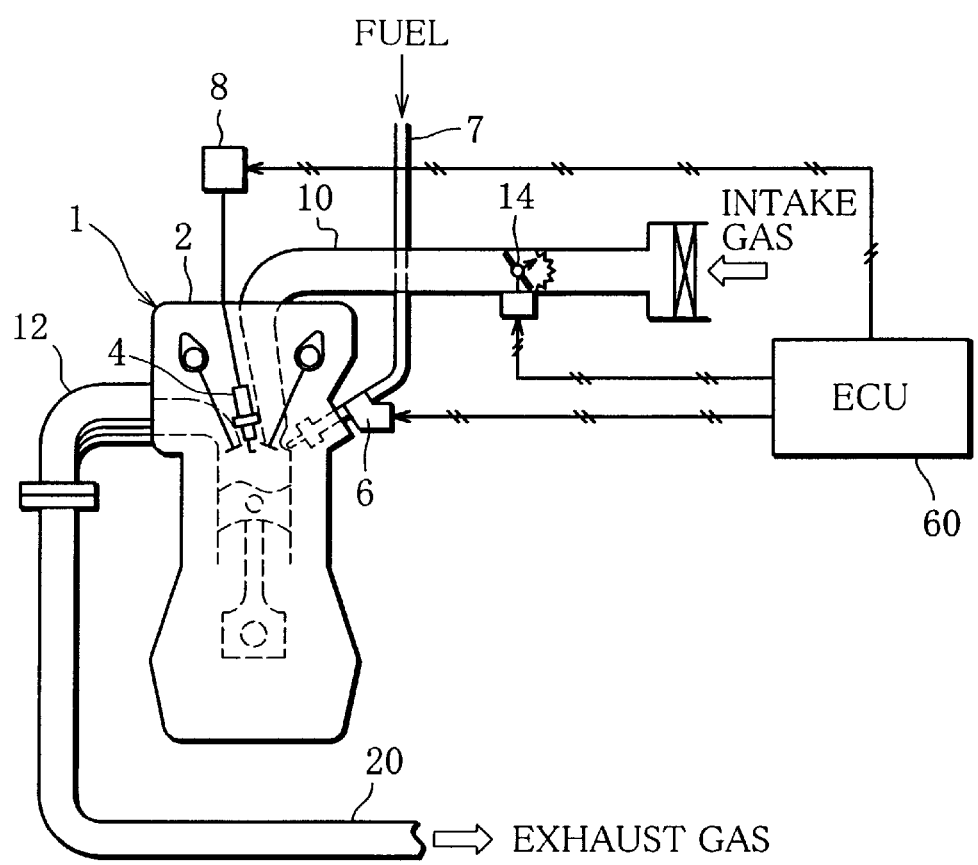
FIG. 10 is a schematic view of an exhaust emission control device of an internal-combustion engine according to third and fourth embodiments of the present invention.

Referring to FIG. 10, there is shown an outline of an exhaust emission control device of an internal-combustion engine according to the third embodiment of the present invention. In this second embodiment, as in the second embodiment described above, a cylinder-injection spark-ignition four-cylinder gasoline engine is also used as the engine 1, for example.

In this case, a dual-type exhaust manifold system is used as the exhaust manifold 12.

Figure 11:
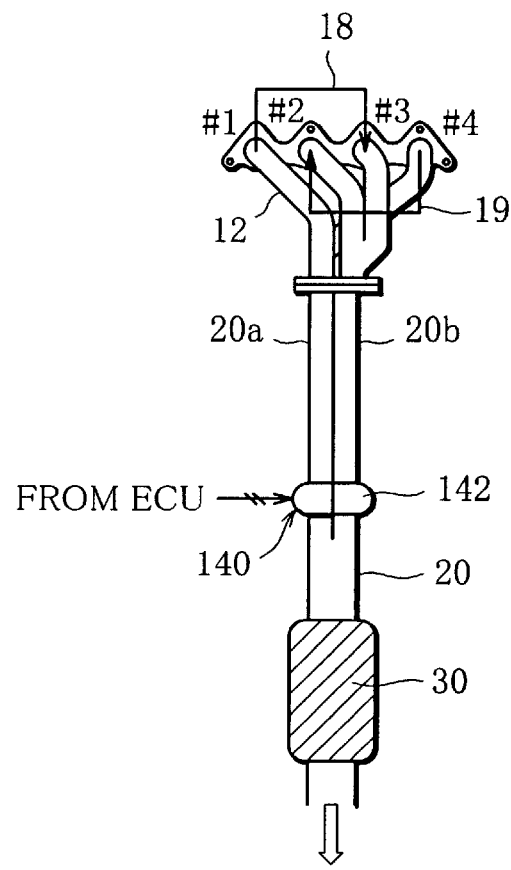
FIG. 11 is a detailed view showing the configuration of an exhaust system of the engine according to the third embodiment.

Referring to FIG. 11, there is shown a detailed view of the exhaust system of the engine 1. The configuration of the exhaust system of the engine 1 according to the third embodiment will now be described with reference to the same drawing.

Combustion in the engine 1 is carried out for #1, #3, #4 and #2 in the order named. In order to avoid exhaust interference, in the exhaust manifold 12 that is formed of the dual-type exhaust manifold system, therefore, the respective exhaust passages of the cylinders #1 and #4 (one cylinder group) that are not continuous with each other join together to form one exhaust passage, while the respective exhaust passages of the cylinders #2 and #3 (other cylinder group) join together to form another exhaust passage. Thus, the exhaust manifold 12, which is formed of the dual-type exhaust manifold system, has two exhaust passages at its outlet.

As shown in the same drawing, the exhaust pipe 20 is divided in two, an exhaust pipe 20a and an exhaust pipe 20b, by means of a screen or the like. The exhaust pipe 20a is connected to the exhaust passages from the cylinders #1 and #4, while the exhaust pipe 20b is connected to the exhaust passages from the cylinders #2 and #3.

The exhaust pipe 20 is fitted with an exhaust flow control device 140 that controls the flow of exhaust gas in the exhaust pipe 20 that includes the exhaust pipe 20a and the exhaust pipe 20b.

The exhaust flow control device 140, like the aforesaid exhaust flow control device 40, is configured to be able to carry out the restraint of the exhaust flow, that is, the rise of the exhaust pressure, increase of the exhaust gas density, and/or reduction of the exhaust flow rate. More specifically, the exhaust flow control device 140 is composed of a closed on-off valve (exhaust flow control means) 142 that can adjust the respective flow areas of the exhaust pipe 20a and the exhaust pipe 20b.

Figure 12:
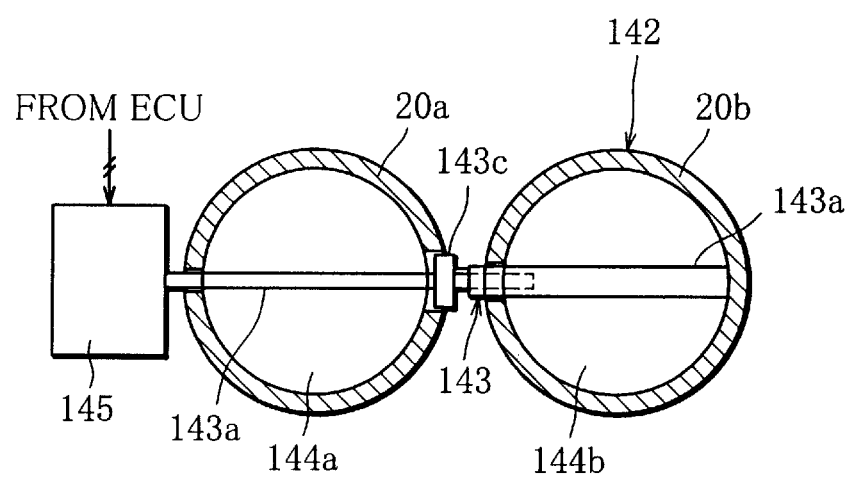
FIG. 12 is a diagram showing a tandem-type butterfly valve for use as an exhaust flow control device.

The closed on-off valve 142 may be any of various types. In this case, a tandem-type butterfly valve such as the one schematically shown in FIG. 12 is used for the purpose.

This tandem-type butterfly valve is constructed so that a valve disc 144a corresponding to the exhaust pipe 20a and a valve disc 144b corresponding to the exhaust pipe 20b are independent of each other, and both are fixed to a rotating shaft 143 so as to be rotatable in synchronism with the rotating shaft 143. Thus, the closed on-off valve 142, as the tandem-type butterfly valve, has the two valve discs 144a and 144b that are integrally formed sharing the one rotating shaft 143.

An actuator 145 is connected to the rotating shaft 143. The butterfly valve is opened and closed as the rotating shaft 143 is rotated by means of the actuator 145.

More specifically, the rotating shaft 143 is composed of a shaft body 143a fitted with the valve disc 144a and a shaft body 143b fitted with the valve disc 144b. The shaft bodies 143a and 143b are connected in series by means of a spring 143c so that the valve discs 144a and 144b are shifted for a given angle around the rotating shaft 143. Thus, the butterfly valve is constructed so that the reduction of the flow area of the exhaust pipe 20a constricted by means of the valve disc 144a is greater than the reduction of the flow area of the exhaust pipe 20b constricted by means of the valve disc 144b when the rotating shaft 143 is rotated to the valve-closing side, and that both the valve discs 144a and 144b are fully opened against the spring force when the rotating shaft 143 is rotated to its full-open position on the valve-opening side.

The exhaust pipe 20 is integrated on the lower-stream side of closed on-off valve 142, and the integrated portion of the exhaust pipe 20 is fitted with the three-way catalyst 30.

The respective exhaust passages of the cylinders #1 and #2 are connected to the respective exhaust passages of the cylinders #3 and #4 by means of small-diameter communicating channels 18 and 19, respectively. The communicating channels 18 and 19 may be formed in the cylinder head 2 in a manner such that the respective exhaust ports of the cylinders #1 and #4 communicate with the respective exhaust ports of the cylinders #2 and #3, respectively.

The following is a description of the operation of the exhaust emission control device according to the third embodiment of the present invention constructed in this manner, that is, cold start control of the engine 1 according to the third embodiment.

Figure 13:
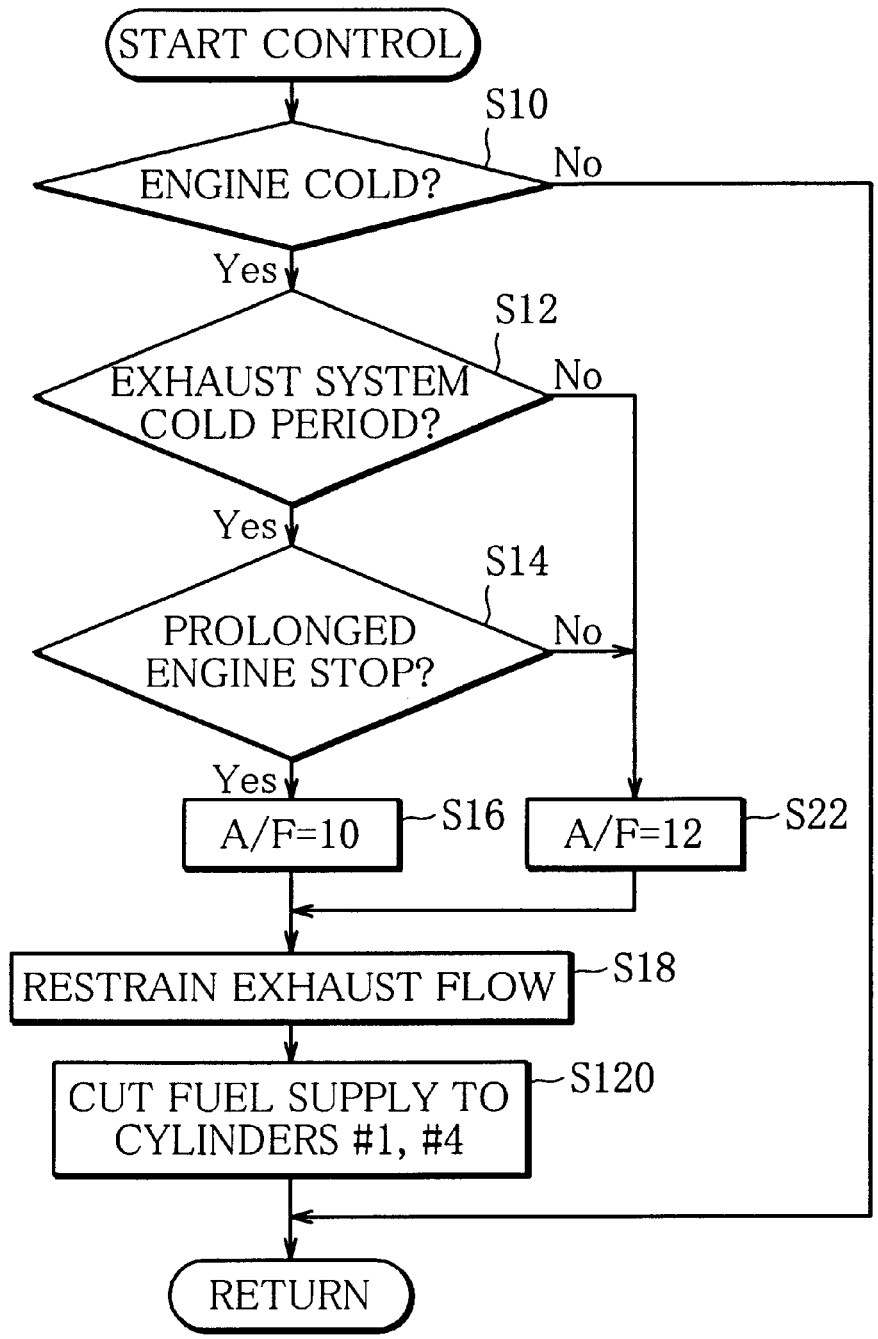
FIG. 13 is a flowchart showing a control routine of start control according to the third embodiment.

Referring to FIG. 13, there is shown a flowchart for a start control routine according to the third embodiment. The start control will now be described with reference to the same drawing. The following is also a description of only those portions which are different from the flowchart of FIG. 3.

After the processes of Steps S10 to S16 or S22 are executed, according to this third embodiment, the actuator 45 of the exhaust flow control device 140 is activated to close the closed on-off valve 142 in Step S18. Thus, both the valve discs 144a and 144b of the tandem-type butterfly valve are closed to reduce the respective flow areas of both the exhaust pipes 20a and 20b.

In Step S120, fuel supply to the cylinders #1 and #4 (one cylinder group) is stopped, that is, fuel-cut (exhaust oxygen quantity increasing means) is executed to discharge only air (exhaust air) into the exhaust pipe 20a. On the other hand, rich-A/F operation is carried out in the cylinders #2 and #3 (other cylinder group) so that unburned substances are discharged into the exhaust pipe 20b with the combustion air-fuel ratio kept at the rich air-fuel ratio. In this case, the fuel injection into the cylinders #2 and #3 is intake-stroke injection.

Thus, the exhaust flow in the exhaust pipes 20a and 20b is restrained. Since the closed on-off valve 142 is constructed so that the reduction of the flow area of the exhaust pipe 20a constricted by means of the valve disc 144a is greater than the reduction of the flow area of the exhaust pipe 20b constricted by means of the valve disc 144b, as mentioned before, however, the degree of restraint of the exhaust flow in the exhaust pipe 20a is higher than the degree of restraint of the exhaust flow in the exhaust pipe 20b, so that the exhaust pressure in the exhaust pipe 20a is higher than the exhaust pressure in the exhaust pipe 20b.

Based on the resulting pressure difference, exhaust air in the exhaust passage of the cylinder #1 flows into the exhaust passage of the cylinder #3 through the communicating channel 18, exhaust air in the exhaust passage of the cylinder #4 flows into the exhaust passage of the cylinder #2 through the communicating channel 19, and exhaust air on the side of the exhaust pipe 20a discharged from the cylinders #1 and #4 is introduced into the respective exhaust passages of the cylinders #2 and #3, that is, into the exhaust pipe 20b.

Thus, in the case of the third embodiment, air can be easily supplied to the exhaust passages of the combustion cylinder group (cylinders #2 and #3 in this case) by carrying out fuel-cut for the cylinders #1 and #4 (one cylinder group) and raising the exhaust pressure in the exhaust pipe 20a.

In the case where the exhaust pressure in the exhaust pipe 20b is also raised to accelerate reaction in the exhaust system by restraining the exhaust flow, in particular, the secondary air cannot be satisfactorily mixed into the exhaust gas if the discharge pressure of the secondary air pump is lower than the exhaust pressure. However, there is a pressure difference is created such that the exhaust pressure in the exhaust passages from the cylinders #1 and #4 (one cylinder group), that is, in the exhaust pipe 20a, is higher than the exhaust pressure in the exhaust passages from the cylinders #2 and #3 (other cylinder group), that is, in the exhaust pipe 20b. If the exhaust pressures in the respective exhaust passages of the combustion cylinder groups are raised by restraining the exhaust flow, therefore, air can be securely supplied to the exhaust passages of the combustion cylinder groups without using any expensive high-output secondary air pump.

If air is thus supplied to the exhaust passages of the combustion cylinder groups from which unburned substances are discharged, oxidation is accelerated satisfactorily in the exhaust system, including the exhaust manifold 12 and the exhaust pipe 20, in the presence of sufficient oxygen with the exhaust flow restrained.

Thus, as in the case of the first embodiment, the delivery of HC, CO, NOx, and other harmful substances can be reduced to improve the exhaust emission control efficiency. Since plenty of heat of reaction is generated, moreover, the exhaust gas temperature can be kept high, and the three-way catalyst 30 can be activated early.

Figure 14:
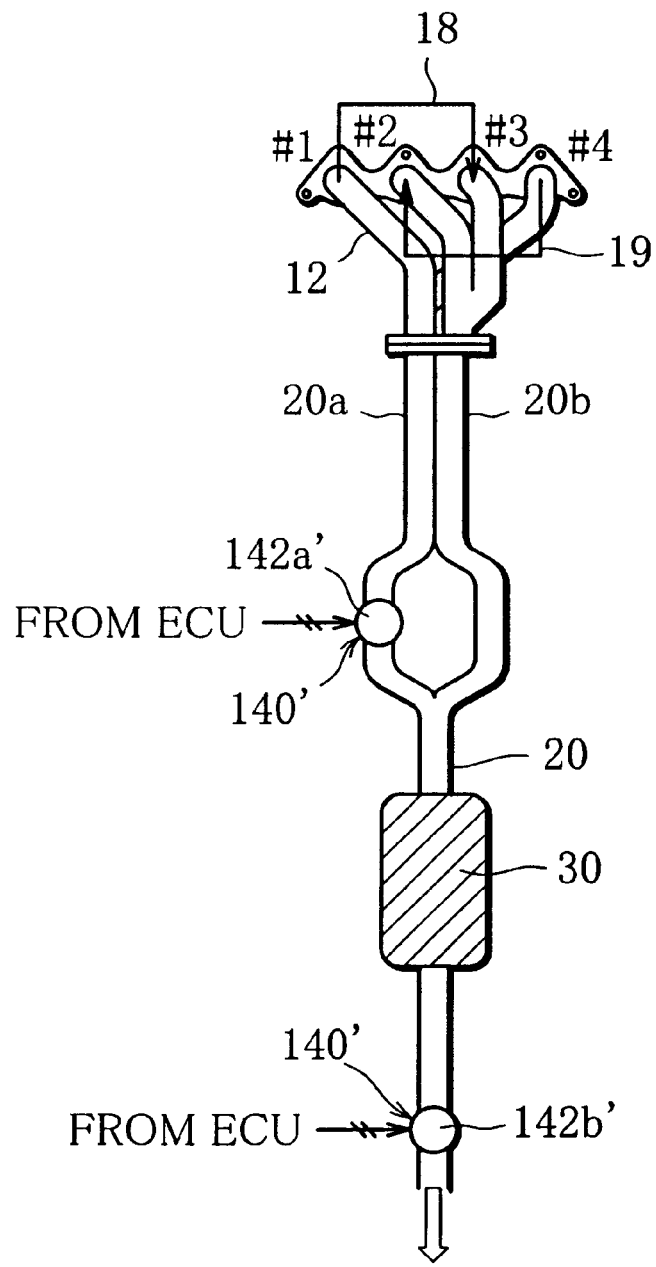
FIG. 14 is a detailed view showing the configuration of an exhaust system of an engine according to a modification 1 of the third embodiment.
Figure 15:
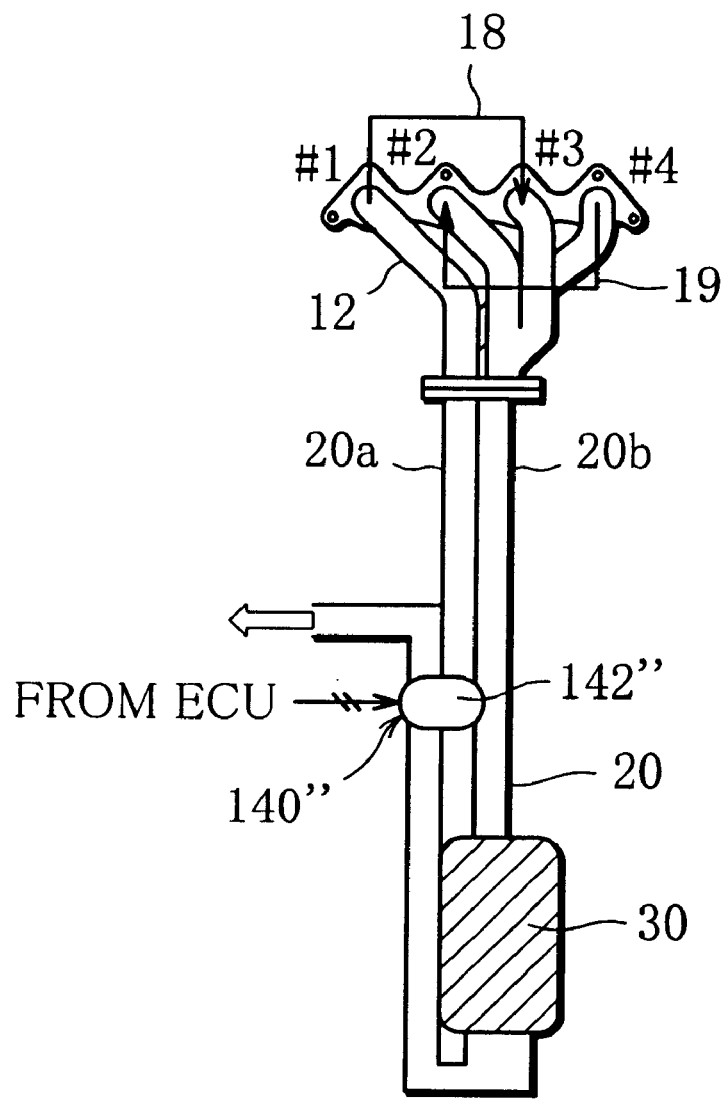
FIG. 15 is a detailed view showing the configuration of an exhaust system of an engine according to a modification 2 of the third embodiment.

Referring to FIGS. 14 and 15, there are shown modifications of the third embodiment. The following is a description of modifications 1 and 2 of the third embodiment.

In the modification 1, as shown in FIG. 14, the respective exhaust passages of the cylinders #1 and #2 are connected to the respective exhaust passages of the cylinders #3 and #4 by means of the small-diameter communicating channels 18 and 19, respectively, as in the case of FIG. 11.

In the modification 1, moreover, a closed on-off valve (throttle means) 142a' corresponding to the exhaust pipe 20a is independently set on the upper-stream side of the three-way catalyst 30, while a closed on-off valve (exhaust flow control means) 142b' corresponding to the exhaust pipe 20b is independently set in that part of the exhaust pipe 20, not of the exhaust pipe 20b, which is situated on the lower-stream side of the three-way catalyst 30. Thus, in this case, the closed on-off valves 142a' and 142b' constitute an exhaust flow control device 140'. For example, butterfly valves are also used for the closed on-off valves 142a' and 142b'.

Thus, in the modification 1, the flow of the exhaust gas from the cylinders #2 and #3, the combustion cylinder group, is restrained within a range including the three-way catalyst 30.

These closed on-off valves 142a' and 142b' are constructed so that the reduction of the flow area of the exhaust pipe 20a constricted by means of the closed on-off valve 142a' is greater than the reduction of the flow area of that part of the exhaust pipe 20 which is situated on the lower-stream side of the three-way catalyst 30, constricted by means of the closed on-off valve 142b'.

When both the closed on-off valves 142a' and 142b' are closed, also in the modification 1, therefore, the degree of restraint of the exhaust flow in the exhaust pipe 20a is higher than the degree of restraint of the exhaust flow in the exhaust pipe 20b, as in the case of FIG. 11. Based on the resulting pressure difference, exhaust air discharged from the cylinders #1 and #4 (one cylinder group) is securely supplied to the respective exhaust passages of the cylinders #2 and #3 (other cylinder group).

Thus, as in the case described above, oxidation is accelerated satisfactorily in the exhaust system, and the delivery of HC, CO, NOx, and other harmful substances can be reduced to improve the exhaust emission control efficiency. Since plenty of heat of reaction is generated, moreover, the exhaust gas temperature can be kept high, and the three-way catalyst 30 can be activated early.

In the case of FIG. 11, the valve discs 144a and 144b of the closed on-off valve 142 are coupled by means of the rotating shaft 143, so that exhaust heat in the exhaust pipe 20b heated by exhaust heat-up is transmitted from the valve disc 144b to the valve disc 144a and cooled by means of the exhaust air in the exhaust pipe 20a. If the closed on-off valves are arranged independently, as in the modification 1, however, such a heat loss can be prevented, so that exhaust heat-up can be carried out satisfactorily in the exhaust pipe 20b, and the three-way catalyst 30 can be activated earlier.

If the closed on-off valve 142b' is located on the lower-stream side of the three-way catalyst 30, moreover, the exhaust gas temperature, having been very high on the upper-stream side of the three-way catalyst 30 owing to the exhaust heat-up in the exhaust pipe 20b, lowers on the lower-stream side of the three-way catalyst 30 because the exhaust heat is used for the heat-up of the three-way catalyst 30. Accordingly, the closed on-off valve 142b' can be prevented from being overheated, so that the durability of the closed on-off valve 142b' can be improved.

In the modification 2, as shown in FIG. 15, the respective exhaust passages of the cylinders #1 and #2 are connected to the respective exhaust passages of the cylinders #3 and #4 by means of the small-diameter communicating channels 18 and 19, respectively, as in the case of FIG. 11 also.

In the modification 2, moreover, that part of the exhaust pipe 20 which is situated on the lower-stream side of the three-way catalyst 30 is bent and extends for a fixed range along the exhaust pipe 20a. This fixed-range portion is fitted with an exhaust flow control device 140" that controls exhaust flows in the exhaust pipe 20a and that part of the exhaust pipe 20 which is situated on the lower-stream side of the three-way catalyst 30.

In this case, as in the case of FIG. 11, a closed on-off valve (exhaust flow control means) 142" formed of a tandem-type butterfly valve is used as the exhaust flow control device 140".

When the closed on-off valve 142" is closed, also in the modification 2, therefore, the degree of restraint of the exhaust flow in the exhaust pipe 20a is higher than the degree of restraint of the exhaust flow in the exhaust pipe 20b. Based on the resulting pressure difference, exhaust air discharged from the cylinders #1 and #4. (one cylinder group) is securely supplied to the respective exhaust passages of the cylinders #2 and #3, the combustion cylinder group (other cylinder group).

Thus, as in the case described above, oxidation is accelerated satisfactorily in the exhaust system, and the delivery of HC, CO, NOx, and other harmful substances can be reduced to improve the exhaust emission control efficiency. Since plenty of heat of reaction is generated, moreover, the exhaust gas temperature can be kept high, and the three-way catalyst 30 can be activated early.

As in the case of the modification 1, furthermore, the exhaust heat in the exhaust pipe 20b heated by exhaust heat-up is transmitted to the exhaust pipe 20a and is never cooled. Thus, a heat loss can be prevented, so that exhaust heat-up can be carried out satisfactorily in the exhaust pipe 20b, and the three-way catalyst 30 can be activated earlier.

As in the case of the modification 1, moreover, the exhaust gas temperature is lowered on the lower-stream side of the three-way catalyst 30 because heat from the exhaust heat-up is used for the heat-up of the three-way catalyst 30. Accordingly, the closed on-off valve 142'' can be prevented from being overheated, so that the durability of the closed on-off valve 142'' can be improved.

In the modification 2, compared with the modification 1, moreover, the closed on-off valve 142'' is formed integrally without being split, the cost can be cut down without failing to secure advantageous effects on exhaust heat-up, durability, etc.

In this case, fuel-cut is carried out for the cylinders #1 and #4, and combustive operation for the cylinders #2 and #3. In contrast with this, however, fuel-cut may be carried out for the cylinders #2 and #3, and combustive operation for the cylinders #1 and #4. If the exhaust pipe from the cylinder group that is subjected to fuel-cut and the exhaust pipe from the cylinder group that undergoes combustive operation are arranged independently of each other, moreover, only one of the cylinders or any three of them may be subjected to fuel-cut. Further, the number of cylinders to be subjected to fuel-cut may be changed depending on the required output or oscillation mode of the engine 1. If the cylinders to be subjected to fuel-cut and the cylinders to be subjected to combustive operation are alternately changed with every given period, the state of the combustion chamber of each cylinder, the heat-up state of the three-way catalyst 30, etc. can be kept constant.

Although the exhaust air is supplied through the execution of fuel-cut in the case described above, the fuel-cut may be replaced with lean-A/F operation such that exhaust gas containing plenty of surplus oxygen is supplied as the exhaust air to the combustion group side (exhaust oxygen quantity increasing means). The same effect as aforesaid can be also obtained in this case.

Making the flow area reduction by means of the valve disc 144a or the closed on-off valve 142a' in the exhaust pipe 20a on the side for the increase of exhaust oxygen greater than the flow area reduction by means of the other valve disc 144b or the closed on-off valve 142b' involves fully cutting off the exhaust pipe 20a by means of the valve disc 144a or the closed on-off valve 142a'. Thus, the secondary air can be securely supplied, and the three-way catalyst 30 on the lower-stream side can be prevented from being cooled by means of low-temperature air.

The following is a description of a fourth embodiment.

A description of those portions of the fourth embodiment which are shared with the first and third embodiments is also omitted, and only different portions will be described below.

FIG. 10 is applied to the fourth embodiment, and a cylinder-injection spark-ignition four-cylinder gasoline engine is used as the engine 1, for example, as in the second and third embodiments described above.

Figure 16:
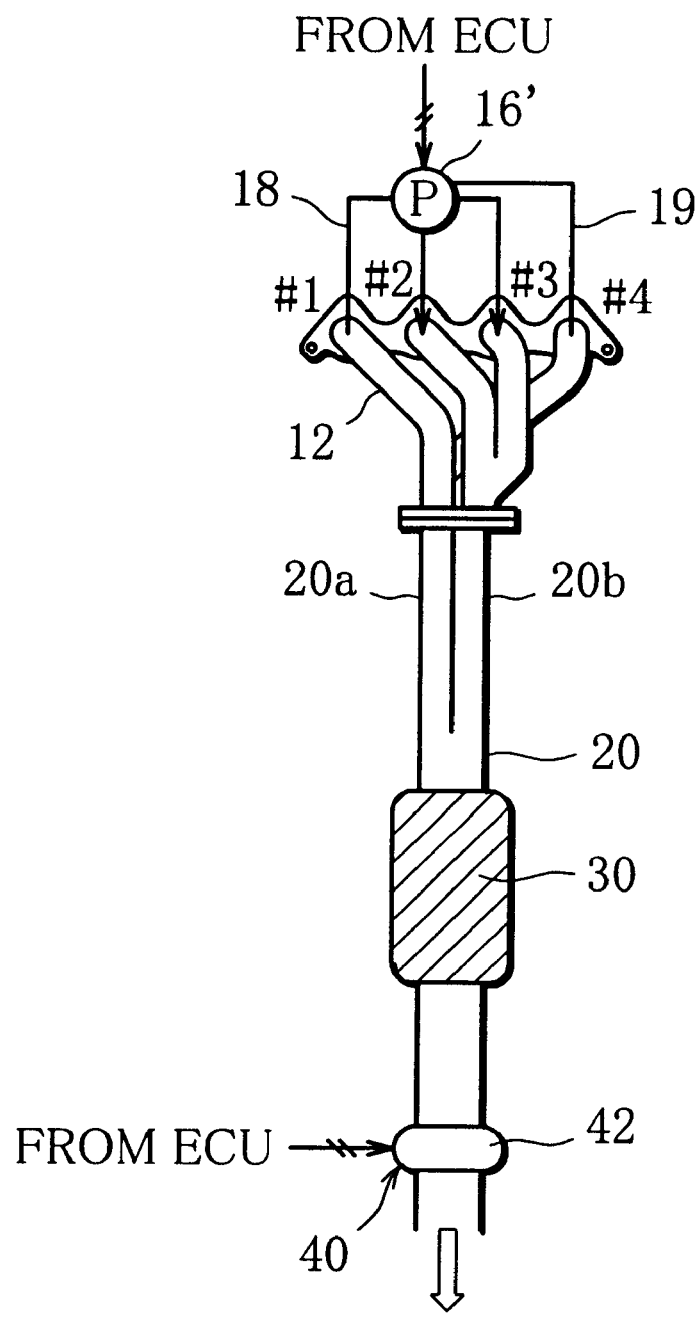
FIG. 16 is a detailed view showing the configuration of an exhaust system of the engine according to the fourth embodiment.

Referring to FIG. 16, there is shown a detailed view of the exhaust system of the engine 1 according to the fourth embodiment of the present invention. The configuration of the exhaust system of the engine 1 according to the fourth embodiment will now be described with reference to the same drawing.

In the fourth embodiment, the communicating channels 18 and 19 are fitted with a small-sized air pump 16' with a discharge pressure of about 150 mmHg (200 hPa), which constitutes an exhaust air system. More specifically, the air pump 16' is configured and arranged so as to force-feed exhaust gas from the exhaust passage of the cylinder #1 to the exhaust passage of the cylinder #3 and from the exhaust passage of the cylinder #4 to the exhaust passage of the cylinder #2.

The closed on-off valve (exhaust flow control means) 42 for use as the exhaust flow control device 40 is set on the lower-stream side of the three-way catalyst 30, whereby the flow of the exhaust gas in the exhaust pipe 20 that includes the exhaust pipe 20a and the exhaust pipe 20b.

The following is a description of the operation of the exhaust emission control device according to the fourth embodiment of the present invention constructed in this manner, that is, cold start control of the engine 1 according to the fourth embodiment.

Figure 17:
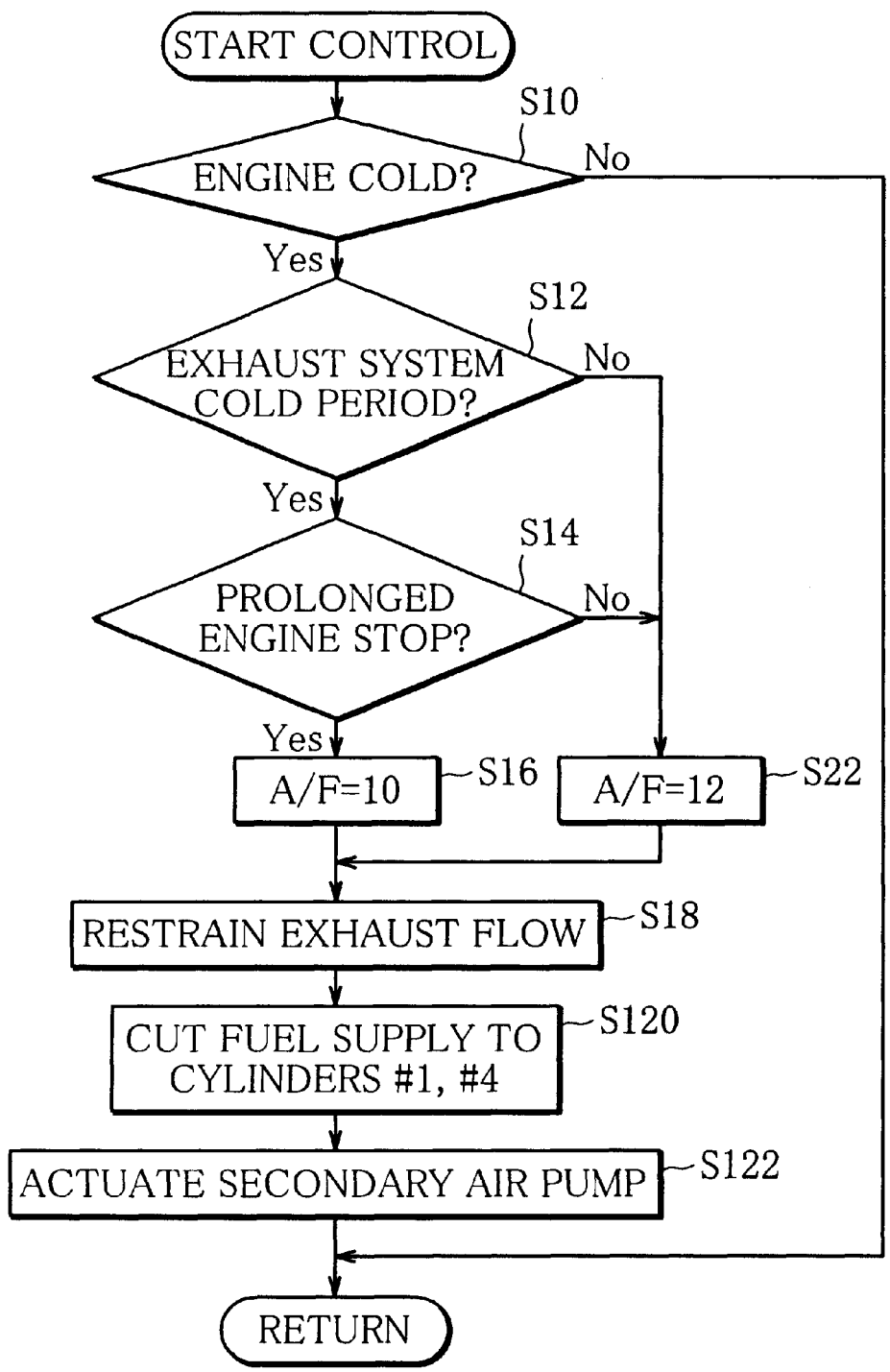
FIG. 17 is a flowchart showing a control routine of start control according to the fourth embodiment.

Referring to FIG. 17, there is shown a flowchart for a start control routine according to the fourth embodiment. The start control will now be described with reference to the same drawing. The following is also a description of only those portions which are different from the flowchart of FIG. 3.

After the processes of Steps S10 to S16 or S22 are executed, according to this fourth embodiment, the closed on-off valve 42 of the exhaust flow control device 40 is closed in Step S18, whereupon the exhaust flow is restrained.

In Step S120, the cylinders #1 and #4 (one cylinder group) is subjected to fuel-cut (exhaust oxygen quantity increasing means) to discharge only air (exhaust air) into the exhaust pipe 20a. On the other hand, rich-A/F operation is carried out in the cylinders #2 and #3 (other cylinder group) so that unburned substances are discharged into the exhaust pipe 20b with the combustion air-fuel ratio kept at the rich air-fuel ratio. In this case, the fuel injection into the cylinders #2 and #3 is intake-stroke injection.

In Step S122, the air pump 16' is actuated to mix the exhaust air discharged from the cylinders #1 and #4 into the exhaust gas from the cylinders #2 and #3, the combustion cylinder group.

Thus, in the case of the fourth embodiment, the exhaust air can be easily supplied to the exhaust passages of the combustion cylinder group despite the absence of the pressure difference between the respective exhaust pressures of the exhaust pipes 20a and 20b, which is present in the third embodiment. Even in the case where exhaust pressure is raised by restraining the exhaust flow, therefore, the exhaust air can be securely supplied to the exhaust passages of the combustion cylinder group by keeping the air pressure on the intake side of the air pump 16' and the exhaust pressure on the discharge side, that is, the exhaust air pressure in the exhaust pipe 20a and the exhaust pressure in the exhaust pipe 20b, on the same level. In this case, the air pump 16' is small-sized, so that it can be easily obtained without entailing high cost.

Thus, as in the case of the first embodiment, the delivery of HC, CO, NOx, and other harmful substances can be reduced to improve the exhaust emission control efficiency. Since plenty of heat of reaction is generated, moreover, the exhaust gas temperature can be kept high, and the three-way catalyst 30 can be activated early.

The air pump 16' may be provided in the communicating channels 18 and 19 of the third embodiment.

The following is a description of a fifth embodiment.

A description of those portions of the fifth embodiment which are shared with the first embodiment is also omitted, and only different portions will be described below.

FIG. 1 is applied to the fifth embodiment, and a cylinder-injection spark-ignition gasoline engine is used as the engine 1, for example, as in the first embodiment described above.

The following is a description of the operation of the exhaust emission control device according to the fifth embodiment of the present invention constructed in this manner, that is, cold start control of the engine 1 according to the fifth embodiment.

Figure 18:
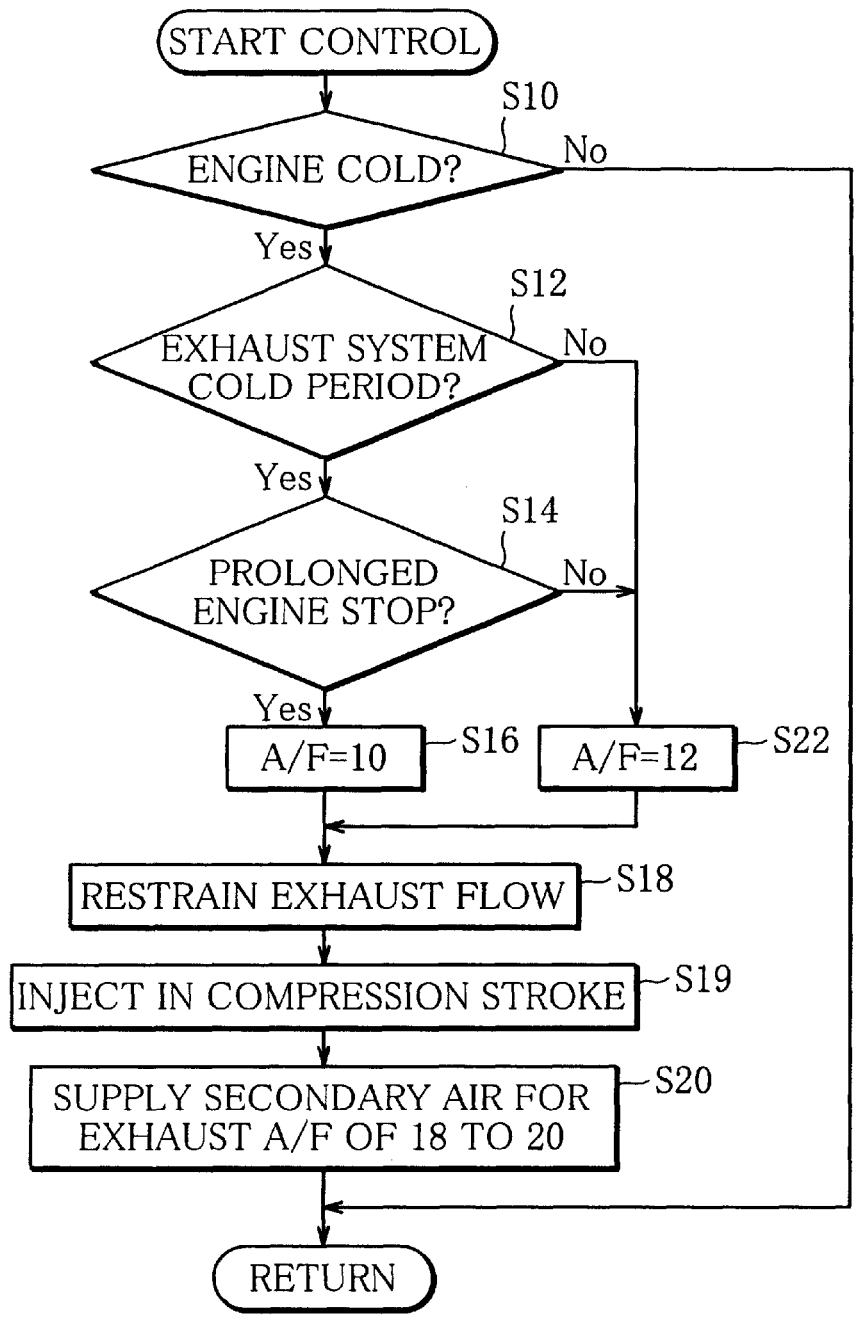
FIG. 18 is a flowchart showing a control routine of start control according to the fifth embodiment.

Referring to FIG. 18, there is shown a flowchart for a start control routine according to the fifth embodiment. The start control will now be described with reference to the same drawing. The following is also a description of only those portions which are different from the flowchart of FIG. 3.

After the processes of Steps S10 to S14 are executed, according to this fifth embodiment, the combustion A/F is adjusted to, for example, 10 (A/F=10) in Step S16, and the combustion A/F is adjusted to, for example, 12 (A/F=12) in Step S22. In this state, however, it is necessary only that the combustion A/F be a rich air-fuel ratio or theoretical air-fuel ratio, and preferably, the combustion A/F should be restricted to the range from a combustion limit air-fuel ratio to 13 (air-fuel ratio control means).

In Step S18, the on-off valve 42 of the exhaust flow control device 40 is closed, whereupon the exhaust flow is restrained.

Then, in Step S19, the fuel injection mode is switched over to a compression-stroke injection mode so that the fuel can be injected in the compression stroke. Preferably, in this case, the compression-stroke injection end timing should be adjusted to BTDC 60° or thereabout.

In Step S20, moreover, the secondary air is supplied from the secondary air pump 16 so that the exhaust A/F is a lean air-fuel ratio ranging from 18 to 22, in particular (secondary air supply means). Preferably, the exhaust A/F should be adjusted to 20.

Thus, air is introduced into the exhaust passages, and the combustion A/F is adjusted to a rich air-fuel ratio or theoretical air-fuel ratio. Unburned substances exist together with oxygen in the air in the exhaust system, and oxygen and the unburned substances react in the exhaust system. As this is done, the fuel is injected in the compression stroke. Thereupon, the spray condition of the fuel becomes favorable, as mentioned before, so that the spark plug 4 smolders less especially when the engine 1 is in the cold state. Therefore, the exhaust gas contains plenty of CO. Since CO reacts more easily than HC does, the reaction in the exhaust system is accelerated satisfactorily.

Figure 19:
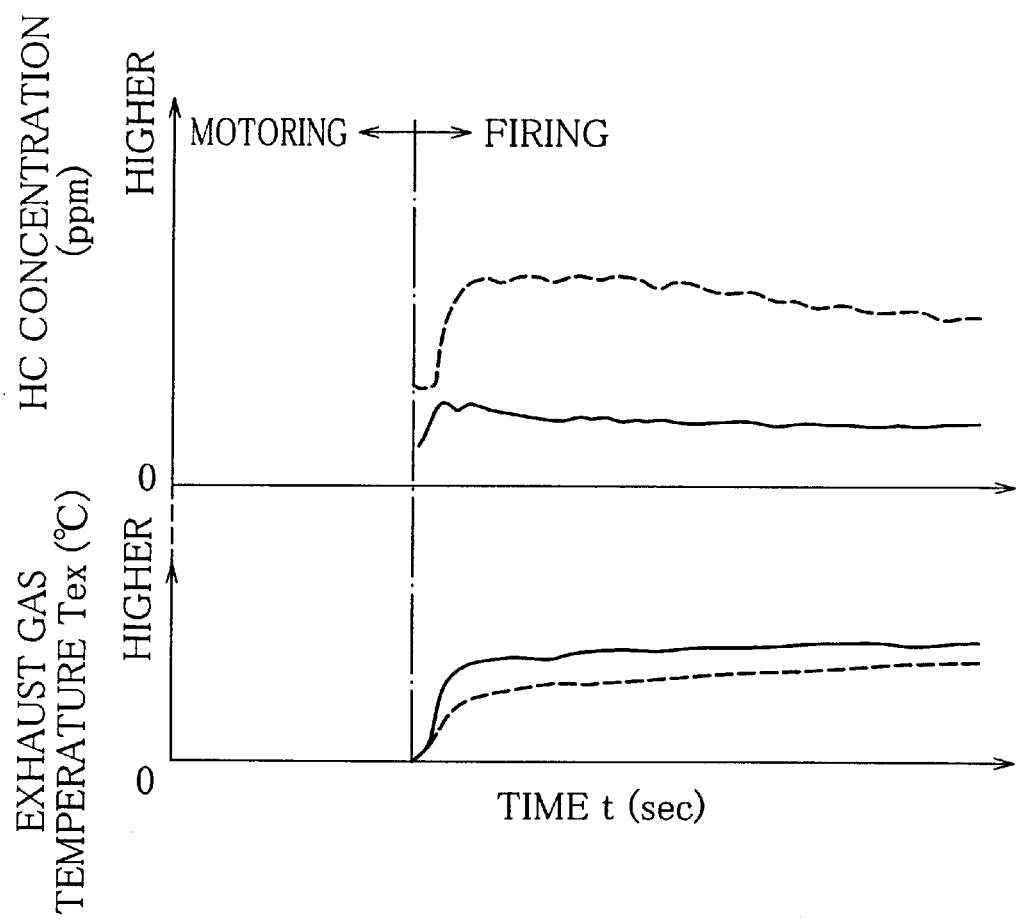
FIG. 19 is a diagram showing time-based changes of the HC concentration and exhaust gas temperature on the lower-stream side of a catalyst for a case (full line) where secondary air and a fuel are supplied and injected in a compression stroke, respectively, compared with a case (broken line) where the fuel is injected in an intake stroke.

Referring to FIG. 19, there is shown a time chart representing time-based changes of the HC concentration and exhaust gas temperature on the lower-stream side of the catalyst for a case (full line) where the secondary air and the fuel are supplied and injected in the compression stroke, respectively, compared with a case (broken line) where the fuel is injected in the intake stroke. If the secondary air and the fuel are thus supplied and injected in the compression stroke, respectively, the delivery of HC can be satisfactorily reduced to increase the exhaust gas temperature immediately after the start of operation (when motoring is switched over to firing).

Thus, the exhaust emission control efficiency can be improved, and the three-way catalyst 30 can be activated early.

According to the fifth embodiment, the secondary air is supplied by means of the secondary air pump 16. Alternatively, however, the exhaust air may be supplied in the manner described in connection with the second to fourth embodiments.

Although the embodiments have been described herein, the present invention is not limited to the embodiments described above.

According to the embodiments described above, for example, the closed on-off valves 42, 142, 142' and 142" are used as the exhaust flow control devices 40, 140, 140' and 140", respectively. If the intake/exhaust system is provided with a turbocharger, however, a waste gate valve of the turbocharger may be used in place of the closed on-off valve 42 or the like.

Further, the secondary air may be supplied by utilizing the boost pressure of the turbocharger.

According to the embodiments described above, moreover, the cylinder-injection gasoline engine is used as the engine 1. Alternatively, however, the engine 1 may be a diesel engine. For the first to fourth embodiments, moreover, it may be a manifold-injection gasoline engine.

What is claimed is:

1. An exhaust emission control device of a multi-cylinder internal-combustion engine, comprising:

exhaust flow control means for restraining an exhaust flow so as to enhance the effect of reduction of the delivery of harmful substances at the start of operation of the internal-combustion engine;

secondary air supply means for supplying oxygen-rich exhaust gas to an exhaust system of said internal combustion engine at the start of operation of said internal-combustion engine by stopping fuel supply to some of the cylinders or carrying out lean-A/F operation; and air-fuel ratio control means for adjusting the combustion air-fuel ratio of-the other cylinders of said internal-combustion engine to a rich air-fuel ratio at the start of operation of said internal-combustion engine.

2. The exhaust emission control device of a multi-cylinder internal-combustion engine according to claim 1, wherein said air-fuel ratio control means controls the combustion air-fuel ratio of said internal-combustion engine so that the combustion air-fuel ratio is not lower than a combustion limit air-fuel ratio and not higher than 13.

3. The exhaust emission control device of a multi-cylinder internal-combustion engine according to claim 1, wherein said secondary air supply means supplies the secondary oxygen-rich exhaust gas to the exhaust system of said internal-combustion engine so that the exhaust air-fuel ratio obtained after the supply of the oxygen-rich exhaust gas is a lean air-fuel ratio.

4. The exhaust emission control device of a multi-cylinder internal-combustion engine according to claim 3, wherein said secondary air supply means supplies the oxygen-rich exhaust gas to the exhaust system of said internal-combustion engine so that the exhaust air-fuel ratio obtained after the supply of the oxygen-rich exhaust gas ranges from 18 to 22.

5. The exhaust emission control device of an internal-combustion engine according to claim 1, and wherein said multi-cylinder-internal-combustion engine comprises two exhaust passages provided independently for each of two cylinder groups into which the cylinders of said multi-cylinder internal-combustion engine are divided and communicating channels connecting the two exhaust passages, said secondary air supply means supplies the oxygen-rich exhaust gas discharged from one of said two cylinder groups to the exhaust passages associated with the other of said two cylinder groups through the communicating channels, and when the oxygen-rich exhaust gas is supplied from said one cylinder group to the exhaust passages of the other cylinder group through the communicating channels as said exhaust flow control means restrains the exhaust flow so that the degree of restraint of the flow of the exhaust gas discharged from said one cylinder group is higher than the degree of restraint of the flow of the exhaust gas discharged from the other cylinder group to allow the oxygen-rich exhaust gas to be supplied to the exhaust passages of the other cylinder group through the communicating channel.

6. The exhaust emission control device of a multi-cylinder internal-combustion engine according to claim 1, wherein said multi-cylinder internal-combustion engine comprises two exhaust passages provided independently for each of two cylinder groups into which cylinders of said multi-cylinder internal-combustion engine are divided and communicating channels connecting the two exhaust passages, and wherein said secondary air supply means supplies the oxygen-rich exhaust gas discharged from one of said two cylinder groups to the exhaust passages associated with the other of said two cylinder groups through the communicating channels and includes an air pump attached to said communicating channels and capable of force-feeding the exhaust gas from the exhaust passages of said one cylinder group to the exhaust passages of the other cylinder group.

7. An exhaust emission control device of a multi-cylinder internal-combustion engine, which has an injection valve for injecting a fuel directly into a combustion chamber, fuel injection control means for controlling fuel injection by means of said injection valve, and air-fuel ratio control means for controlling the air-fuel ratio, comprising:

exhaust flow control means for restraining an exhaust flow so as to enhance the effect of reduction of the delivery of harmful substances at the start of operation of the internal-combustion engine; and secondary air supply means for supplying oxygen-rich exhaust gas to an exhaust system of said internal combustion engine at the start of operation of said internal-combustion engine by stopping fuel supply to some of the cylinders or carrying out lean-A/F operation, wherein, when said secondary air supply means supplies the oxygen-rich exhaust gas from some of the cylinders to the exhaust system of said internal-combustion engine, said fuel injection control means controls the fuel injection of said internal-combustion engine such that fuel is injected into the other cylinders in a compression stroke thereof and said air-fuel ratio control means adjust the combustion air-fuel ratio of the other cylinders to the theoretical air-fuel ratio or a rich air-fuel ratio.

8. The exhaust emission control device of a multi-cylinder internal-combustion engine according to claim 7, wherein said multi-cylinder internal-combustion engine comprises two exhaust passages provided independently for each of two cylinder groups into which cylinders of said multi-cylinder internal-combustion engine are divided and communicating channels connecting the two exhaust passages, and wherein said secondary air supply means supplies the oxygen rich exhaust gas discharged from one of said two cylinder groups to the exhaust passages associated with the other of said two cylinder groups through the communicating channels and includes an air pump attached to said communicating channels and capable of force-feeding the exhaust gas from the exhaust passages of said one cylinder group to the exhaust passages of the other cylinder group.

9. The exhaust emission control device of multi-cylinder internal-combustion engine according to claim 7, and wherein said multi-cylinder internal-combustion engine comprises two exhaust passages provided independently for each of two cylinder groups into which the cylinders of said multi-cylinder internal-combustion engine are divided and communicating channels connecting the two exhaust passages, said secondary air supply means supplies the oxygen-rich exhaust gas discharged from one of said two cylinder groups to the exhaust passages associated with the other of said two cylinder groups through the communicating channels, and when the oxygen-rich exhaust gas is supplied from said one cylinder group to the exhaust passages of the other cylinder group through the communicating channels as said exhaust flow control means restrains the exhaust flow so that the degree of restraint of the flow of the exhaust gas discharged from said one cylinder group is higher than the degree of restraint of the flow of the exhaust gas discharged from the other cylinder group to allow the oxygen-rich exhaust gas to be supplied to the exhaust passages of the other cylinder group through the communicating channel.

10. The exhaust emission control device of a multi-cylinder internal-combustion engine according to claim 7, wherein said secondary air supply means supplies the oxygen-rich exhaust gas to the exhaust system of said internal-combustion engine so that the exhaust air-fuel ratio obtained after the supply of the oxygen-rich exhaust gas is a lean air-fuel ratio.

11. The exhaust emission control device of a multi-cylinder internal-combustion engine according to claim 10, wherein said secondary air supply means supplies the oxygen-rich exhaust gas to the exhaust system of said internal-combustion engine so that the exhaust air-fuel ratio obtained after the supply of the oxygen-rich exhaust gas ranges from 18 to 22.

* * * * *